United States Patent [19]

Akagiri

[11] Patent Number: 5,490,130
[45] Date of Patent: Feb. 6, 1996

[54] APPARATUS AND METHOD FOR COMPRESSING A DIGITAL INPUT SIGNAL IN MORE THAN ONE COMPRESSION MODE

[75] Inventor: Kenzo Akagiri, Kanagawa, Japan

[73] Assignee: Sony Corporation, Tokyo, Japan

[21] Appl. No.: 165,259

[22] Filed: Dec. 10, 1993

[30] Foreign Application Priority Data

Dec. 11, 1992 [JP] Japan ..................... 4-331792

[51] Int. Cl.$^6$ ............... G10L 5/00; G11B 7/00; G11B 27/36
[52] U.S. Cl. ............... 369/124; 369/54; 369/60; 395/2.13; 395/2.1; 395/2.39; 375/240
[58] Field of Search ............... 369/124, 54, 60; 395/2.38, 2.13, 2.14, 2.36, 2.1, 2.39; 381/37; 375/240

[56] References Cited

U.S. PATENT DOCUMENTS

| 5,243,588 | 9/1993 | Maeda et al. | 369/54 |
| 5,244,705 | 9/1993 | Tsurushima et al. | 428/64 |
| 5,264,846 | 11/1993 | Oikawa | 395/2.13 |
| 5,294,925 | 3/1994 | Akagiri | 381/37 |
| 5,301,205 | 4/1994 | Tsutsui et al. | 375/1 |
| 5,311,561 | 5/1994 | Akagiri | 395/2.13 |
| 5,388,209 | 2/1995 | Akagiri | 395/2.38 |

FOREIGN PATENT DOCUMENTS

| 0338781A2 | 4/1989 | European Pat. Off. | G11B 20/18 |
| 0348132A2 | 6/1989 | European Pat. Off. | G11B 20/18 |
| 0516342A3 | 5/1992 | European Pat. Off. | G11B 27/00 |

Primary Examiner—Georgia Y. Epps
Assistant Examiner—Kim-Kwok Chu
Attorney, Agent, or Firm—Limbach & Limbach; Ian Hardcastle

[57] ABSTRACT

An apparatus for deriving a compressed digital signal from a digital input signal by compressing the digital input signal in a selected one of at least two compression modes. The compressed digital signal has a different bit rate in each of the compression modes. The apparatus includes a receiving circuit that receives the digital input signal at the same sampling frequency in all compression modes. The apparatus also includes a low-pass filter that has a cut-off frequency set according to the selected one of the compression modes. The low-pass filter receives the digital input signal and provides a bandwidth-limited signal. Finally, the apparatus includes a compressor circuit that derives the compressed digital signal from the bandwidth-limited signal. In an alternative embodiment, the apparatus comprises a circuit that receives the digital input signal at the same sampling frequency in each of the compression modes. The apparatus also includes a block dividing circuit that divides the digital input signal in time into blocks. Each block has a block length; and the block lengths of the blocks have a maximum block length that depends on the selected one of the compression modes. The maximum block length is greater in the compression modes in which the digital output signal has a lower bit rate. Finally, the apparatus includes a compressor circuit that derives the compressed digital signal from the blocks of the digital input signal.

40 Claims, 12 Drawing Sheets

APPARATUS AND METHOD FOR COMPRESSING A DIGITAL INPUT SIGNAL IN MORE THAN ONE COMPRESSION MODE

FIELD OF THE INVENTION

This invention relates to an apparatus and method for deriving a compressed digital signal from a digital input signal in which the compressed digital signal can be compressed in more than one compression mode having different bit rates.

BACKGROUND OF THE INVENTION

The inventor's assignee has proposed in, e.g., U.S. Pat. Nos. 5,243,588 and 5,244,705, and U.S. patent application Ser. No. 07/736,046, now abandoned on Mar. 3, 1994, the disclosures of which are incorporated herein by reference, a technique for compressing a digital audio input signal and recording the resulting compressed recording signal in bursts with a predetermined number of bits of the compressed recording signal as a recording unit.

With this technique, the compressed recording signal is an adaptive differential PCM (ADPCM) audio signal, and a magneto-optical disc is used as the recording medium for recording the compressed recording signal according to the so-called CD-I (CD-Interactive) or CD-ROM XA recording signal format. The compressed recording signal is recorded in bursts on the magneto-optical disc, with, e.g., 32 sectors of the compressed recording signal plus several linking sectors as a recording unit. The linking sectors are used to accommodate the additional signal generated by interleaving the compressed recording signal in the 32 sectors.

A recording and reproducing apparatus for a magneto-optical disc may employ one of several recording and reproduction modes for the compressed recording signal. In the CD-I and CD-XA formats, recording modes A, B, and C have been defined in which an uncompressed PCM audio signal, similar to that recorded on a normal Compact Disk (CD), but with a lower sampling frequency, is compressed to provide the compressed recording signal for recording on the magneto-optical disc. Recording mode A has a sampling frequency of 37.8 kHz, and the PCM audio signal is compressed by a compression ratio of two; recording mode B has the same sampling frequency as mode A and compression ratio of four; and recording mode C has a sampling frequency of 18.9 kHz, and a compression ratio of eight. In recording mode B, for example, the PCM audio input signal is compressed by a compression ratio of four, so that the playback time of a compact disc on which a mode B recording signal is recorded is four times that of a disc recorded according to the standard CD format (CD-DA format). Using a recording mode in which the PCM audio signal is compressed enables the size of the recording and reproducing apparatus to be reduced, because a recording or playback time comparable with that of a standard 12 cm disc can be provided by a smaller-sized disc.

The velocity of the recording track relative to the pickup head (the "recording velocity") of the smaller-sized disc on which a recording mode B compressed signal is recorded is chosen to be the same as that of a standard CD. This means that the bit rate of the compressed recording signal reproduced from the disc is four times the bit rate required by the mode B decoder. This allows the same recording unit of the compressed recording signal to be read from the disc four times, but only one of the four readings of the recording unit of the compressed recording signal is fed into the decoder.

The compressed recording signal is recorded on the disc on a spiral track. When reproducing the track, the pickup head is caused to execute a radial track jump on each complete revolution of the disc. The track jump returns the head to its original position on the track. Causing the head to execute four track jumps causes the head to read the same part of the track four times. This method of reproducing the compressed recording signal recorded on the track is advantageous, especially when used in a small-sized portable apparatus, since it enables satisfactory reproduction to be obtained even if only one of the four readings of the recording unit of the compressed recording signal is free of errors. This method of reproducing the compressed recording signal from the disc therefore provides a strong immunity against reproduction errors caused by physical disturbances and the like.

In future, semiconductor memories are expected to be used as a medium for recording digital audio signals. To enable semiconductor memories to provide a usable playing time, it is necessary to increase the compression ratio further by using variable bit rate compression encoding, such as entropy encoding. Specifically, it is anticipated that audio signals will be recorded and/or reproduced using IC cards employing semiconductor memories. A compressed recording signal that has been compressed using a variable bit rate compression technique will be recorded on and reproduced from the IC card.

Although it is expected that, in future, with progress in semiconductor technology, the playing time provided by an IC card will increase, and the cost of the IC card will decrease, compared with the playing time and cost of a present-day IC card, the IC card, which has barely started to be supplied to the market, is at present expensive and has a short playing time. Therefore, it is thought that an IC card might be used early on by transferring to it part of the contents of another, less expensive, larger capacity, recording medium, such as a magneto-optical disc. Signal exchange and re-recording operations would be conducted between the IC card and the magneto-optical disc. Specifically, a desired one or more selections recorded on the magneto-optical disc would be copied to the IC card. The copied selections would then be replaced by other selection(s) when desired. By repeatedly exchanging the selections recorded on the IC card, a variety of selections may be played on a portable IC card player using a small number of available IC cards.

Different applications require different bandwidths and signal-to-noise ratios for recording and reproducing audio signals. For example, when an audio signal is to be recorded and reproduced with high-fidelity quality, a bandwidth extending to 15 kHz or 20 kHz, and a large signal-to-noise ratio are required. To provide these characteristics using a system in which a compressed digital recording signal is recorded on a recording medium and reproduced therefrom, the compressed recording signal must have a relatively high bit rate. For example, a bit rate in the range of 256 kbps to 64 kbps per audio channel is required. On the other hand, when a digital audio signal representing speech is to be recorded and reproduced, a bandwidth extending to 5 kHz or 7 kHz is more than adequate, and a lower signal-to-noise ratio may be acceptable. Such characteristics may be provided using a bit rate in the range of 64 kbps to several kbps. Lower bit rates increase the recording time of the recording medium. Thus, to record different types of audio signals while making optimum use of the recording capacity of the recording medium, the recording/reproducing apparatus should be capable of recording and reproducing at different bit rates as economically as possible.

Conventional recording and reproducing apparatus using, for example the above-mentioned recording modes A, B, and C operate at several different sampling frequencies to provide recording modes with different bandwidths and signal-to-noise ratios. To operate at different sampling frequencies requires a complex sampling frequency signal generating circuit, and increased complexity in the LSI signal processing circuits. Moreover, when the sampling frequencies of the compression modes are different, switching the encoder between the different recording modes is difficult.

When a compressed recording signal recorded on a high-capacity magneto-optical disc with a high bit rate is to be convened so that it can be recorded on a low-capacity IC card using a low bit rate recording mode, the compressed recording signal must be expanded back to an uncompressed PCM signal, which must then be compressed again using a low bit rate recording mode. This requires a large amount of signal processing, which economically-viable signal processing LSIs may be unable to carry out in real time.

Additionally, in the low bit rate recording modes, the reduction in the number of bits available to represent the audio signal can lead to a deterioration of sound quality. For example, if the bandwidth is narrowed, and the bandwidth of bands into which the spectral coefficients are grouped is the same at all frequencies, dividing the audio frequency range of 0 Hz to 20 kHz into 32 bands makes the bandwidth of each band approximately 700 Hz. This is many times the bandwidth of the low-frequency critical bands, which is typically about 100 Hz, and is larger that the bandwidth of critical bands throughout most of the middle and low frequencies. This mismatch between the bandwidth of these equal bandwidth bands and the bandwidth of the critical bands at low and middle frequencies significantly reduces the efficiency of the compression process.

OBJECTS AND SUMMARY OF THE INVENTION

It is an object of the invention to provide an encoder capable of compressing a digital input signal in one of plural compression modes in which the complication of having a sampling frequency generating circuit that generates plural sampling frequencies, and the consequent increase in the scale of the LSI, are avoided.

It is a further object of the invention to provide an encoder capable of compressing a digital input signal in a compression mode providing a compressed signal having a low bit rate for recording on a recording medium with a limited storage capacity, such as an IC card.

It is a yet further object of the invention to provide an encoder for compressing a digital input signal in a compression mode providing a compressed signal having a low bit rate in which the deterioration of sound quality resulting from using the low bit rate is minimized.

Accordingly, the invention provides an apparatus for deriving a compressed digital signal from a digital input signal by compressing the digital input signal in a selected one of at least two compression modes. The compressed digital signal has a different bit rate in each of the compression modes. The apparatus includes a receiving circuit that receives the digital input signal at the same sampling frequency in all compression modes. The apparatus also includes a low-pass filter that has a cut-off frequency set according to the selected one of the compression modes. The low-pass filter receives the digital input signal and provides a bandwidth-limited signal. Finally, the apparatus includes a compressor circuit that derives the compressed digital signal from the bandwidth-limited signal.

The apparatus may additionally comprise a circuit that divides the bandwidth-limited signal in time into blocks. Each block has a block length, and the block lengths of the blocks have a maximum block length that depends on the selected one of the compression modes. In this case, the compressor circuit derives the compressed digital signal from the blocks of the bandwidth-limited signal.

The compressor circuit may include a frequency dividing circuit that derives spectral coefficients from the bandwidth-limited signal, and a quantizing circuit that quantizes the spectral coefficients grouped by frequency into bands. The bands have a wider bandwidth towards higher frequencies. The frequency dividing circuit may include an orthogonal transform circuit.

The apparatus may additionally include a filter circuit that divides the band-limited signal in frequency into a frequency range signal in each of plural frequency ranges, and a block dividing circuit that divides each frequency range signal in time into blocks. In this case, the frequency circuit includes a circuit that orthogonally transforms the blocks of each frequency range signal to provide the spectral coefficients.

The invention also provides an apparatus for deriving a compressed digital signal from a digital input signal by compressing the digital input signal in a selected one of at least two compression modes. The compressed digital signal has a different bit rate in each of the compression modes. The apparatus comprises a circuit that receives the digital input signal at the same sampling frequency in each of the compression modes. The apparatus also includes a block dividing circuit that divides the digital input signal in time into blocks. Each block has a block length; and the block lengths of the blocks have a maximum block length that depends on the selected one of the compression modes. The maximum block length is greater in the compression modes in which the digital output signal has a lower bit rate. Finally, the apparatus includes a compressor circuit that derives the compressed digital signal from the blocks of the digital input signal.

The apparatus may additionally include a frequency dividing circuit that derives spectral coefficients from the digital input signal, and a quantizing circuit that quantizes the spectral coefficients grouped by frequency into bands. The bands have a wider bandwidth towards higher frequencies. The frequency dividing circuit may include an orthogonal transform circuit.

The apparatus may additionally comprise a filter circuit that divides the digital input signal in frequency into a frequency range signal in each of plural frequency ranges. In this case, the block dividing circuit divides each frequency range signal in time into blocks. Each block has a block length; and the block lengths of the blocks have a maximum block length that depends on the selected one of the compression modes. Also, in this case, the frequency dividing circuit includes a circuit that orthogonally transforms the blocks of each frequency range signal to provide the spectral coefficients.

The invention further provides a method for deriving a compressed digital signal from a digital input signal by compressing the digital input signal in a selected one of at least two compression modes. The compressed digital signal has a different bit rate in each of the compression modes. In the method, the digital input signal is received at the same sampling frequency in all the compression modes. The digital input signal is subject to low-pass filtering with a cut-off frequency set according to the selected one of the compression modes to provide a bandwidth-limited signal. Finally, the compressed digital signal is derived from the bandwidth-limited signal.

The method may additionally include dividing the bandwidth-limited signal in time into blocks. Each block has a block length; and the block lengths of the blocks have a maximum block length depending on the selected one of the compression modes. In this case, the compressed digital signal is derived from the blocks of the bandwidth-limited signal.

Deriving the compressed digital signal may include deriving spectral coefficients from the bandwidth-limited signal, and quantizing the spectral coefficients grouped by frequency into bands having a wider bandwidth towards higher frequencies.

The method may also additionally include dividing the band-limited signal in frequency into a frequency range signal in each of plural frequency ranges, and dividing each frequency range signal in time into blocks. In this case, deriving spectral coefficients from the bandwidth-limited signal may include orthogonally transforming the blocks of each frequency range signal to provide the spectral coefficients.

The method may also include providing a recording medium and recording the compressed signal on the recording medium.

Finally, the invention provides a method for deriving a compressed digital signal from a digital input signal by compressing the digital input signal using a selected one of at least two compression modes. The compressed digital signal has a different bit rate in each of the compression modes. In the method, the digital input signal is received at the same sampling frequency in all compression modes. The digital input signal is divided in time into blocks. Each block has a block length; and the block lengths of the blocks have a maximum block length depending on the selected one of the compression modes. The maximum block length is greater in the compression modes in which the digital output signal has a lower bit rate. Finally, the compressed digital signal is derived from the blocks of the digital input signal.

Deriving the compressed signal may include deriving spectral coefficients from the digital input signal and quantizing the spectral coefficients grouped by frequency into bands having a wider bandwidth towards higher frequencies.

The method may additionally comprise dividing the digital input signal in frequency into a frequency range signal in each of plural frequency ranges. In this case, each frequency range signal is divided in time into blocks. Each block has a block length; and the block lengths of the blocks have a maximum block length depending on the selected one of the compression modes. Also, in this case, deriving spectral coefficients from the digital input signal may include orthogonally transforming the blocks of each frequency range signal to provide the spectral coefficients.

The method may also include providing a recording medium and recording the compressed signal on the recording medium.

The encoder according to the invention uses the same sampling frequency regardless of the bit rate of each compression mode. This saves having to use a complex sampling frequency signal generating circuit capable of generating plural sampling frequencies, and allows the scale of the LSI to be reduced.

Moreover, when the sampling frequencies of the respective compression modes are the same, conversion of signals between the different compression modes can be carried out more easily than if the compression modes use different sampling frequencies. When the compressed signal compressed in a high bit rate compression mode and recorded on a large-capacity recording medium, such as a magneto-optical disc, is to be transferred to a small-capacity recording medium, such as an IC card, in a lower bit-rate compression mode, it is not necessary to cancel the compression of the high-bit rate compression mode completely and to fully expand the compressed signal. Instead, it is possible, simply with additional processing, to convert the compression mode to a lower bit rate compression mode. This reduces amount of signal processing required, and allows the process to be carried out in real-time or faster than real-time.

Also, in the encoder according to the invention, in the lower bit rate compression modes, signal processing operations are not carried out above the upper frequency limit of the compression mode. This saves a number of signal processing operations, which can be used to provide additional signal processing to improve the sound quality in the low bit rate compression modes.

The frequency range division filters located prior to the orthogonal transform circuits in the encoder according to the invention may be used to save having to perform signal processing in the high frequency range. In compression modes in which the entire high frequency range is unnecessary, no signal processing need be carried out in the high frequency range. Even in compression mode B, in which the high frequency range is partly used, the number of signal processing operations is reduced by downsampling the frequency range signal in the high frequency range.

In the lower bit rate compression modes, the number of bits usable for quantizing the spectral coefficients is reduced, giving rise to the need for preventing deterioration in sound quality. In the encoder according to the present invention, the maximum block length of the blocks of the frequency range signals subject to orthogonal transform processing and quantizing is increased, which improves the compression efficiency. With an increased maximum block length, the process of orthogonally transforming the frequency range signals from the time domain to the frequency domain can be carried out more accurately. Also, and the amount of sub-information, such as scale factors and word length data in the compressed signal can be reduced.

If the spectral coefficients were divided by frequency into bands having an equal bandwidth, dividing the frequency range of 0 Hz to 22 kHz into 32 bands would generate bands with a bandwidth of about 700 Hz. This is many times wider than the critical bandwidth of about 100 Hz at low frequencies, and is wider than the critical bandwidth at middle frequencies. This mismatch would considerably reduce the compression efficiency.

Therefore, in the encoder according to the present invention, the bandwidth of the bands into which the spectral coefficients resulting from the orthogonal transform are divided for allocating quantizing bits is selected to be broader towards higher frequencies, at least in most bands, so as to correspond more closely with the critical bandwidths. This prevents a lowering of the compression efficiency, as would be the case if the spectral coefficients were uniformly divided in frequency.

In the low bit rate compression modes, quantizing bits and sub information are not allocated to bands at and above the upper bandwidth limit of the digital input signal to avoid wasting bits.

Also, to minimize the deterioration of sound quality resulting from using a lower bit rate compression mode, the maximum block length of the blocks of the frequency range signals subject to orthogonal transform processing and quantizing is increased as the bit rate is reduced.

DETAILED DESCRIPTION OF THE INVENTION

A preferred embodiment of the present invention will now be described with reference to the accompanying drawings.

1. OVERVIEW OF THE RECORDING/REPRODUCING APPARATUS

Figure 1:
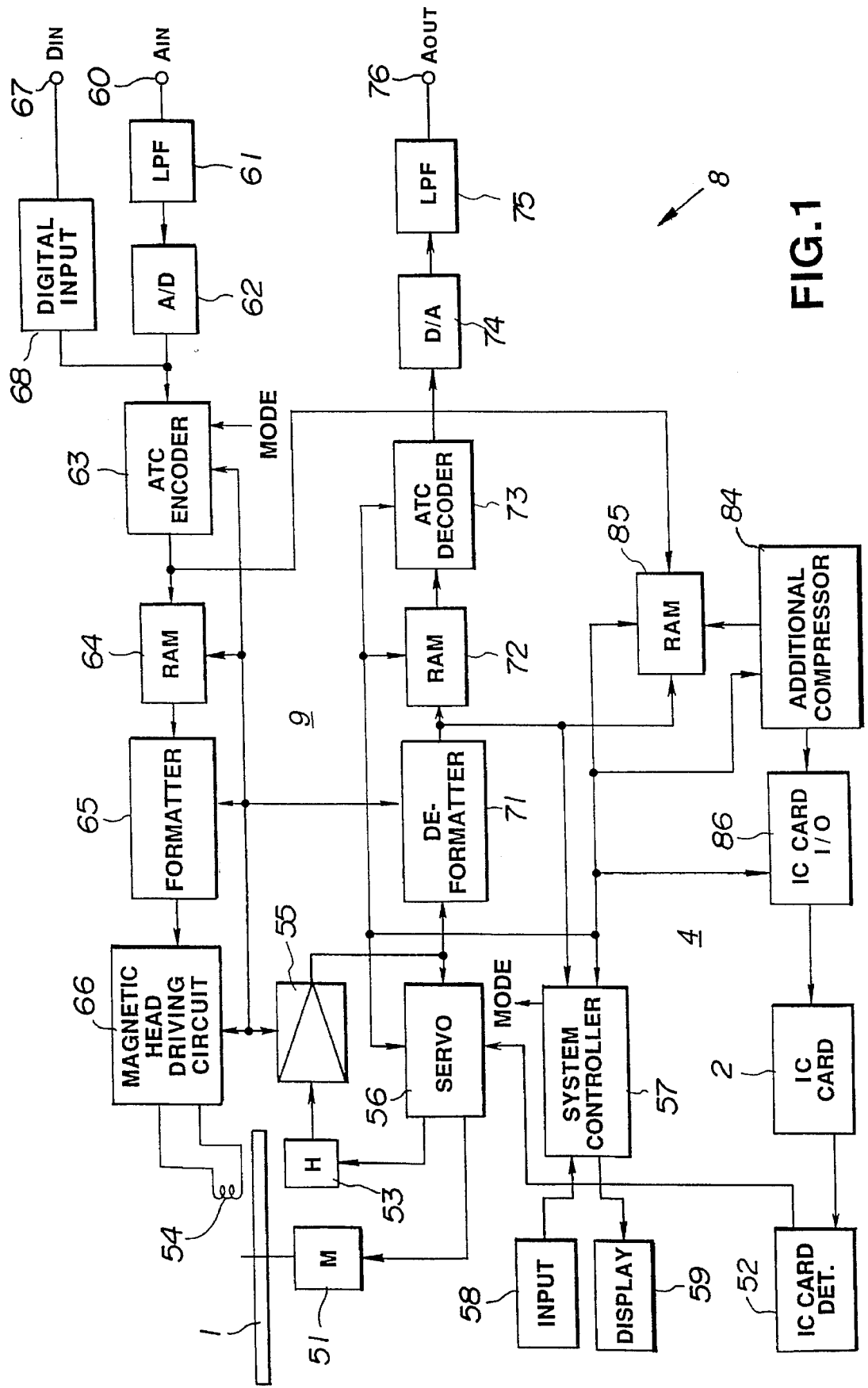
FIG. 1 is a block diagram of a practical example of a recording and reproducing apparatus for a compressed recording signal and including an encoder according to the present invention.

FIG. 1 shows the schematic arrangement of an embodiment of an apparatus 8 for recording and reproducing a compressed recording signal. The apparatus includes an encoder according to the invention for compressing the digital input signal.

The apparatus 8 shown in FIG. 1 comprises the recording and reproducing system 9 for a first recording medium, such as the magneto-optical disc 1, and the recording system 4 for a second recording medium, such as the IC card 2. The recording system 4 may additionally be capable of reproducing the compressed signal from the IC card 2. The IC card recording system may additionally or alternatively record on a variety of IC memories, such as an IC memory cartridge or an IC memory pack.

When the compressed recording signal recorded on the magneto-optical disc 1 is copied to the IC card 2, the deformatter 71 processes the compressed recording signal read out from the magneto-optical disc 1 by the optical head 53. The deformatter 71 applies eight-to-fourteen modulation (EFM) demodulation and de-interleaving or error correction to the compressed recording signal read out from the magneto-optical disc 1. The compressed recording signal from the deformatter 71 is written into the memory 85 of the IC card recording system 4, where it is processed by the additional compressor 84. The additional compressor additionally compresses the compressed recording signal stored in the memory 85 using variable bit-rate coding, for example, entropy coding.

In the copying process just described, the compressed recording signal reproduced from the magneto-optical disc 1 is fed into the IC card recording and reproduction system 4 in a compressed state, that is, the reproduced compressed recording signal is not expanded by the decoder 73. The unexpanded compressed recording signal is then additionally compressed before being recorded on the IC card 2.

The recording and reproducing apparatus 8 has two operating modes for reproducing the compressed recording signal recorded on first recording medium, e.g., the magneto-optical disc 1: a normal mode and a high-speed copy mode. In the normal reproduction mode, the compressed recording signal is reproduced from the magneto-optical disc intermittently or in bursts. The compressed recording signal is formatted in recording units that contain a predetermined number of bits. For example, a recording unit can consist of a cluster including 32 sectors of the compressed recording signal, together with several additional sectors to accommodate the additional signal resulting from interleaving the compressed recording signal in the 32 sectors. The reproduced compressed recording signal is then expanded and converted to provide at least one audio output signal.

In the high-speed copy mode, the compressed recording signal is copied at high speed from the first recording medium to the second recording medium, the IC card 2 in the example shown. The compressed recording signal recorded on the first recording medium is read out continuously, is continuously additionally compressed, and is continuously fed to the second recording medium, where it is continuously recorded. This results in high-speed or short duration copying. The increase in copying speed is equal to the compression ratio of the compressed recording signal recorded on the first recording medium.

2. RECORDING & REPRODUCING APPARATUS DESCRIPTION (a) The Magneto-Optical Disc Mechanism The recording and reproducing apparatus 8 shown in FIG. 1 will now be described in detail. In the magneto-optical disc recording and reproducing system 9 of the recording and reproducing apparatus, the recording medium is the magneto-optical disc 1, which is rotationally driven by a spindle motor 51.

The compressed recording signal is recorded along the recording track pre-formed on the magneto-optical disc 1 using magnetic field modulation recording. In this, a magnetic field, modulated in accordance with the compressed recording signal, is applied to one side of the magneto-optical disc 1 by the magnetic head 54, driven by the magnetic head driver circuit 66, and laser light is radiated onto the other side of the disc 1 by the optical head 53. The magnetic field and the laser light together perform thermomagnetic recording.

The compressed recording signal is reproduced from the magneto-optical disc 1 by tracing the recording track using laser light from the optical head 53 to reproduce the recorded signal photomagnetically.

The optical head 53 includes a laser light source, such as a laser diode; optical components, such as a collimator lens, object lens, polarization beam splitter, and a cylindrical lens; and a photodetector having a light receiving section of a predetermined pattern. The optical head 53 is located facing the magnetic head 54 on the opposite side of the magneto-optical disc 1.

The optical head 53 also detects the laser light reflected from the recording track at the point at which the compressed recording signal is written or read to enable the optical head to detect focusing errors and tracking errors. When reproducing the compressed recording signal from the magneto-optical disc 1, the optical head 53 detects focusing errors using the so-called astigmatic method and detects tracking errors using the so-called push-pull method.

The optical head 53 also detects variations in the polarization angle (Kerr rotation angle) of the laser light reflected from the recording track and from this generates a playback signal. The playback signal from the optical head 53 is fed into the RF circuit 55, which extracts the focusing and tracking signals from the output of the optical head 53 and supplies them to the servo control circuit 56. The RF circuit also converts the output of the optical head into binary signals, which it supplies to the deformatter 71, which will be described in detail below.

The servo control circuit 56 consists of, for example, a focusing servo control circuit, a tracking servo control circuit, a spindle motor servo control circuit and a head feed servo control circuit. The focusing servo control circuit controls the optical system of the optical head 53 to reduce the focusing error signal to zero. The tracking servo control circuit also controls the optical system of the optical head to reduce the tracking error signal to zero. The spindle motor servo control circuit controls the spindle motor 51 to rotate the magneto-optical disc I to establish a constant linear velocity between the recording track and the optical head. The head feed servo control circuit causes the optical head 53 and the magnetic head 54 to be moved radially relative to the magneto-optical disc 1 to the recording track on the magneto-optical disc designated by the system controller 57.

The servo control circuit 56, while performing the above-mentioned control operations, transmits information indicating the operating states of various pans controlled by it to other pans of the circuit, such as to the system controller 57, which will be described below.

(b) System Controller

The control key input 58 and the display 59 are connected to the system controller 57. The system controller controls the recording and reproducing system according to the operating mode selected by input information entered by the user at the operating key input 58. The system controller 57 also controls the positions of the optical head 53 and the magnetic head 54 on the recording track in both record and playback, in response to sector-by-sector address information, including header time or subcode Q data, reproduced from the recording track of the magneto-optical disc 1.

The system controller 57 also causes compression mode information to be displayed on the display 59. In record, the compression mode information is supplied by the encoder 63 in response to the setting of a compression mode control key (not shown) in the operating key input 58. In playback, the compression mode information is supplied by the reproducing system, which extracts the compression mode information from the compressed recording signal reproduced from the magneto-optical disc 1, as will be described below.

Finally, the system controller 57 displays the playback time on the display 59. The playback time is derived by multiplying sector-by-sector address information (absolute time information), such as header time or sub-code Q data, reproduced from the recording track of the magneto-optical disc 1, by the compression ratio of the designated compression mode to provide the real playback time. For example, if the compression ratio is four, the absolute time read off the magneto-optical disc is multiplied by four to give the real playback time. If absolute time information is preformatted on the recording track of the magneto-optical disc in the course of making the disc, the preformatted absolute time information may be read and multiplied by the compression ratio to display the real playback time of the current position of reproduction.

(c) Magneto-Optical Disc Recording System

In the recording system of the recording and reproducing unit 9 of the recording/reproducing apparatus, the analog audio input signal $A_{IN}$ is supplied from the input terminal 60 to the analog-to-digital (A/D) converter 62 via the low-pass filter 61. The A/D converter converts the analog audio input signal $A_{IN}$ to a PCM digital audio input signal. The digital audio input signal from the A/D converter is supplied to the encoder 63. A PCM digital audio input signal $D_{IN}$ from the input terminal 67 may alternatively be supplied via the digital input interface circuit 68 to the encoder 63.

The encoder 63 receives the digital audio input signal at the system sampling rate and compresses it according to the one of the compression modes shown in Table 1 designated by the system controller 57. For example, if the designated compression mode is compression mode B, the encoder receives the digital input signal at a sampling rate of 44.1 kHz, and feeds a compressed signal into the memory 64 with a bit rate of 64 kb/s. The encoder reduces the bit rate of the standard CD-DA format of by a factor of about eight, i.e., from 75 sectors/second to 9.375 sectors/second.

TABLE 1

| | (Sampling Frequency = 44.1 kHz) | | |
|---|---|---|---|
| COMPRESSION MODE | BIT RATE kbps/channel | BANDWIDTH kHz | FRAME LENGTH msec |
| A | 128 | 22 | 11.6 |
| B | 64 | 13 | 23.2 |
| C | 32 | 5.5 | 34.8 |
| D | 16 | 3 | 46.4 |

In the embodiment shown in FIG. 1, the sampling frequency of the A/D converter 62 is the same as the sampling frequency of the standard CD-DA format, i.e., 44.1 kHz, and the encoder 63 operates at this sampling frequency in all compression modes. However, since the bandwidth of the compressed recording signal is reduced in the lower bit rate compression modes, the cut-off frequency of the low-pass filter 61 must be set according to the selected compression mode.

The system controller 57 controls writing the compressed signal into and reading the compressed recording signal out of the buffer memory 64. The buffer memory 64 temporarily stores the compressed signal from the encoder 63 in readiness for recording it on the disc. In the compression mode B, the compressed signal from the encoder 63 has a transfer rate that is one eighth of the transfer rate of 75 sectors/ second of the standard CD-DA format, i.e. 9.375 sectors/ second.

The compressed signal is continuously written into the buffer memory 64. Although it is possible for the compressed recording signal to be read out of the buffer memory 64 and to be recorded into one of every eight sectors on the disc, as described above, it is preferred to record the compressed recording signal quasi-continuously into plural sectors on the disc, as will be described below, because recording into one of every eight sectors is infeasible.

To record the compressed recording signal in a quasi-continuous manner, recording is performed in a burst with an instantaneous transfer rate of 75 sectors/second, after a waiting period in which no recording takes place. The transfer rate is the same transfer rate as that of the standard CD-DA format. Recording is performed in a recording unit of a cluster of a predetermined number of sectors. Preferably, each cluster includes 32 sectors, plus several additional sectors to accommodate the additional amount of signal that results from interleaving the compressed recording signal in the 32 sectors.

Under control of the system controller 57, the compressed signal is written continuously into the buffer memory 64 at the transfer rate of 9.375 (75/8) sectors/second of compression mode B. Also under control of the system controller, the compressed recording signal is read out from the buffer memory 64 in bursts with an instantaneous transfer rate of 75 sectors/second. The overall transfer rate for the compressed recording signal read out from the buffer memory 63 and recorded on the magneto-optical disc 1, including the non-recording period, is the low rate of 9.375 sectors/ second. However, the instantaneous transfer rate during recording is the standard rate of 75 sectors/second. This way, if the recording velocity of the magneto-optical disc 1 is the same as that of the standard CD-DA format, the recording on the magneto-optical disc 1 has the same recording density and the same recording pattern as a CD-DA format recording.

The compressed recording signal read out from the memory 64 in bursts at an instantaneous transfer rate of 75 sectors/second is supplied to the formatter 65. In the formatter, the compressed recording signal is formed into recording units of clusters consisting of plural sectors, preferably, 32 sectors, together with several cluster-linking sectors arrayed before and after the plural sectors. The number of cluster-linking sectors is set so that the cluster-linking sectors can accommodate the additional signal that results from interleaving the compressed recording signal in the plural sectors. This way, each cluster accommodates a self-contained portion of the compressed recording signal that is unaffected by the interleaving of the portions of the compressed recording signal in adjoining clusters.

The formatter 65 additionally processes the compressed recording signal read out in bursts from the buffer memory 64 by subjecting it to encoding for error correction, such as parity appending and interleaving, and by subjecting it to eight-to-fourteen (EFM) encoding. The compressed recording signal from formatter 65 is fed into the magnetic head driving circuit 66. The head driving circuit is connected to the magnetic head 54 and causes the magnetic head to apply a magnetic field, modulated in accordance with the compressed recording signal, to the magneto-optical disc 1.

The system controller 57 controls the position of the optical head 53 and the magnetic head 54 on the recording track of the magneto-optical disc 1 so that the compressed recording signal read out from the buffer memory 64 in bursts is recorded on the recording track of the magneto-optical disc. The system controller also supplies a control signal designating the recording position on the recording track of the magneto-optical disc to the servo control circuit 56.

(d) Magneto-Optical Disc Reproducing System

The reproducing system of the magneto-optical disc recording and reproducing system 9 will now be described.

The reproducing system reproduces the compressed recording signal quasi-continuously recorded on the recording track of the magneto-optical disc 1 by the above-mentioned recording system. The optical head 53 illuminates the disc 1 with laser light and generates a playback signal in response to light reflected from the disc. The playback signal is fed into the RF circuit 55 where it is converted into a binary playback signal, which is fed into the deformatter 71. The reproducing system is also capable of reproducing a normal compact disc (CD-DA) as well as the magneto-optical disc 1.

The deformatter 71 is the counterpart of the formatter 65 in the recording system described above. The deformatter processes the binary playback signal from the RF circuit 55 by applying EFM decoding, error correction, and de-interleaving to provide the compressed recording signal in the selected compression mode with a transfer rate of 75 sectors/ second. This is faster than the transfer rate of the selected compression mode.

Under control of the system controller 57, the compressed recording signal from the de-formatter 71 is repetitively written into the buffer memory 72 at a transfer rate of 75 sectors/second, and is continuously read out from the buffer memory once at the transfer rate of 9.375 sectors/second, corresponding to the transfer rate of the selected compression mode B.

The system controller 57 also controls the position of the optical head 53 on the recording track of the magneto-optical disc 1 to cause the compressed recording signal to be repetitively reproduced from the recording track of the disc 1 for repetitive writing into the memory 72. The system controller supplies a control signal designating the playback position on the recording track of the magneto-optical disc to the servo control circuit 56.

The compressed signal is transferred continuously from the memory 72 to the decoder 73 at the transfer rate of 9.375 sectors/second of compression mode B. The decoder 73 performs decoding complementary to the encoding performed by the encoder 63 in the recording system. The operating mode of the decoder 73 is designated by the system controller 57. The decoder 73 expands the compressed signal by a factor of eight to provide the digital audio output signal, a 16-bit PCM signal. The digital audio output signal is fed from the decoder 73 to the digital-to-analog (D/A) converter 74.

The D/A converter 74 converts the digital audio output signal from the decoder 73 into the analog audio output signal $A_{OUT}$, which passes via the low-pass filter 75 to the analog audio output terminal 76. The digital audio output signal may also be fed to a digital audio output terminal (not shown).

(e) IC Card Recording System

The digital audio input signal, obtained by converting the analog audio input signal $A_{IN}$ supplied from the input terminal 60 via the low-pass filter 61 in the A/D converter 62, or fed in directly through the digital input 67, is compressed by the encoder 63 to provide the compressed signal. The compressed signal is additionally compressed by the additional compressor 84 for recording on the IC card 2. The additional compressor is preferably a type of variable bit rate encoder, and implements so-called entropy encoding. The compressed signal from the encoder 63 is fed to the additional compressor 84 via the buffer memory 85. The compressed signal is read out of the buffer memory 85 to the additional compressor 84, which performs variable bit rate encoding, such as entropy encoding. The resulting additionally-compressed signal is recorded in the IC card 2 via the IC card interface circuit 86. Alternatively, a fixed bit rate signal, without entropy encoding, may be recorded on the IC card.

(f) High-Speed Copying

The IC card recording system 4 can not only record an analog or a digital input signal fed into the analog input terminal 60 or the digital input terminal 67, respectively, but can also record the compressed recording signal copied from the magneto-optical disc 1 at high speed.

The system controller 57, in response to the high-speed copy key of the operating key input 58, prepares the apparatus in readiness for entering into the high-speed copy mode. When the IC card 2 is inserted into the IC card recording unit 4, the IC card detection circuit 52 sends a signal to the system controller 57 via the servo 56. When the IC card detection circuit 52 detects that the IC card 2 has been inserted into the recording unit 4, the system controller sets the apparatus into the high-speed copy mode.

In response to the system controller 57, the servo 56 causes the compressed recording signal recorded on the magneto-optical disc 1 to be reproduced continuously (i.e., no track jumps are performed). The resulting reproduced compressed recording signal from the deformatter 71 is supplied directly, i.e., without expansion, to the buffer memory 85 in the IC card recording system 4. The compressed signal is processed by the additional compressor 84 with variable bit rate coding, and is then recorded on the IC card 2 via the IC card interface circuit 86. If the compressed recording signal recorded on the magneto-optical disc 1 is compressed in accordance with compression mode B, the transfer rate of the compressed recording signal reproduced from the magneto-optical disc, and hence the transfer rate of the compressed signal from the deformatter 71, is eight times the normal transfer rate.

Thus, during high-speed copying, the compression mode B compressed recording signal recorded on the magneto-optical disk 1 is continuously reproduced from the magneto-optical disc, and is copied to the IC card 2 after variable length encoding at eight times the normal rate. Thus, selections recorded on the magneto-optical disc 1 can be copied to the IC card 2 in one-eighth of real time. As stated above, the additional compressor 84 may alternatively compress the compressed signal using a lower, fixed bit rate, instead of a variable bit rate.

The speed ratio of the copying process depends on the compression mode of the compressed recording signal recorded on the magneto-optical disc 1. However, if the magneto-optical disc is rotationally driven to provide a recording velocity that is a multiple of the normal recording velocity, copying may be performed at a speed ratio greater than the speed ratio that results from the compression of the compressed recording signal recorded on the magneto optical disc 1.

Figure 2:
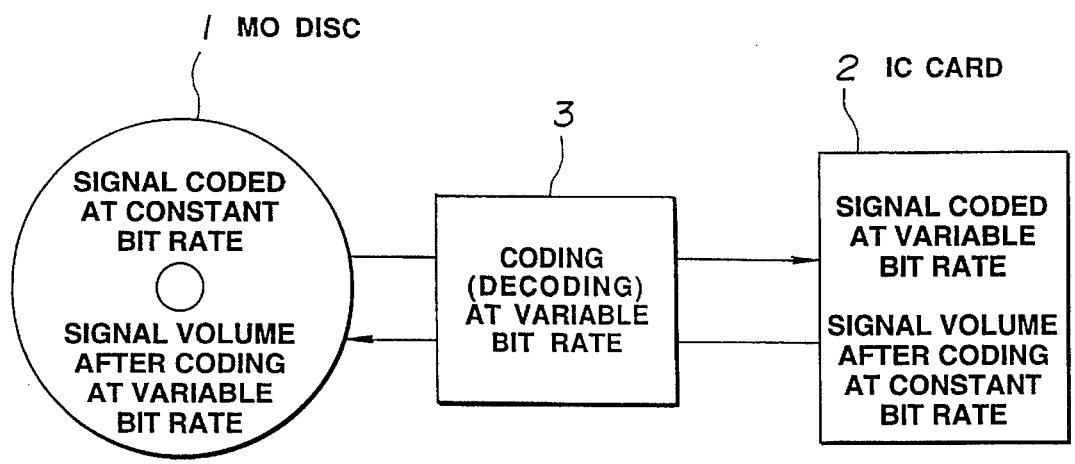
FIG. 2 illustrates the contents recorded in a magneto-optical disc and an IC card.

Referring to FIG. 2, the compressed recording signal having a constant bit rate is recorded on the magneto-optical disc 1 together with signal volume information indicating the number of bits in the additionally-compressed signal resulting when the variable-rate coder 3 additionally compresses the compressed signal. The signal volume information indicates the number of bits in the additionally-compressed recording signal to be recorded on the IC card 2, and indicates the recording capacity required on the IC card 2 to record the additionally-compressed recording signal. By providing signal volume information for each selection on the magneto-optical disc 1, the number of selections recorded on the magneto-optical disc 1 which may be accommodated by the IC card 2, or the combination of these selections, can be known instantly by reading out the signal volume information from the magneto-optical disc.

Additionally, if, in addition to the additionally-compressed recording signal, second signal volume information that indicates the number of bits in the compressed signal, prior to the additional compression, is recorded on the IC card 2, the capacity of the magneto-optical disc 1 required when selections are copied from the IC card 2 back to the magneto-optical disc may also be known instantly.

(g) View of the Apparatus

Figure 3:
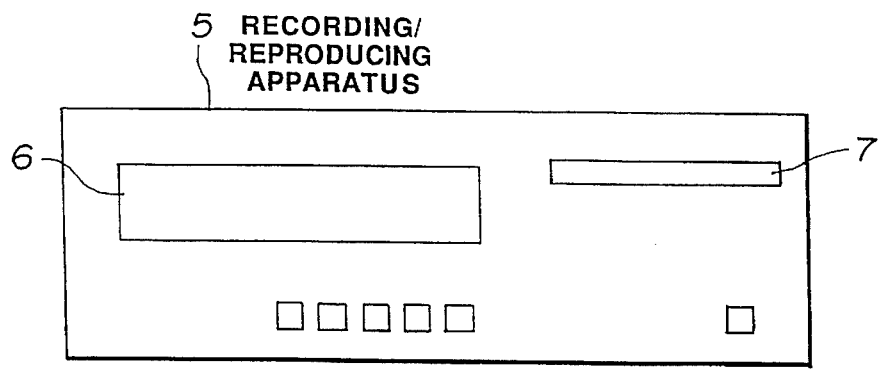
FIG. 3 shows an example of the appearance of the front panel of the recording and reproducing apparatus.

FIG. 3 shows a front view of the recording and reproducing apparatus 5, the circuit of which is shown in FIG. 1. The apparatus includes the magneto-optical disc inserting section 6 and the IC card inserting slot 7. Alternatively, the magneto-optical recording and reproducing system 9 (FIG. 1) and the IC card recording system 4 may be independent units, with the required signals being transmitted between them using suitable links, such as electrical or optical cables, or RF or optical transmission and reception.

3. SIGNAL COMPRESSION

The techniques for compressing the digital input signal, such as a PCM audio input signal, using the techniques of sub-band coding (SBC), adaptive transform coding (ATC) and adaptive bit allocation (APC-AB) used in the encoder 63 in FIG. 1, and the corresponding expansion techniques used in the decoder 73 will now be described with reference to FIG. 4 and following Figures.

(a) Overview

Figure 4:
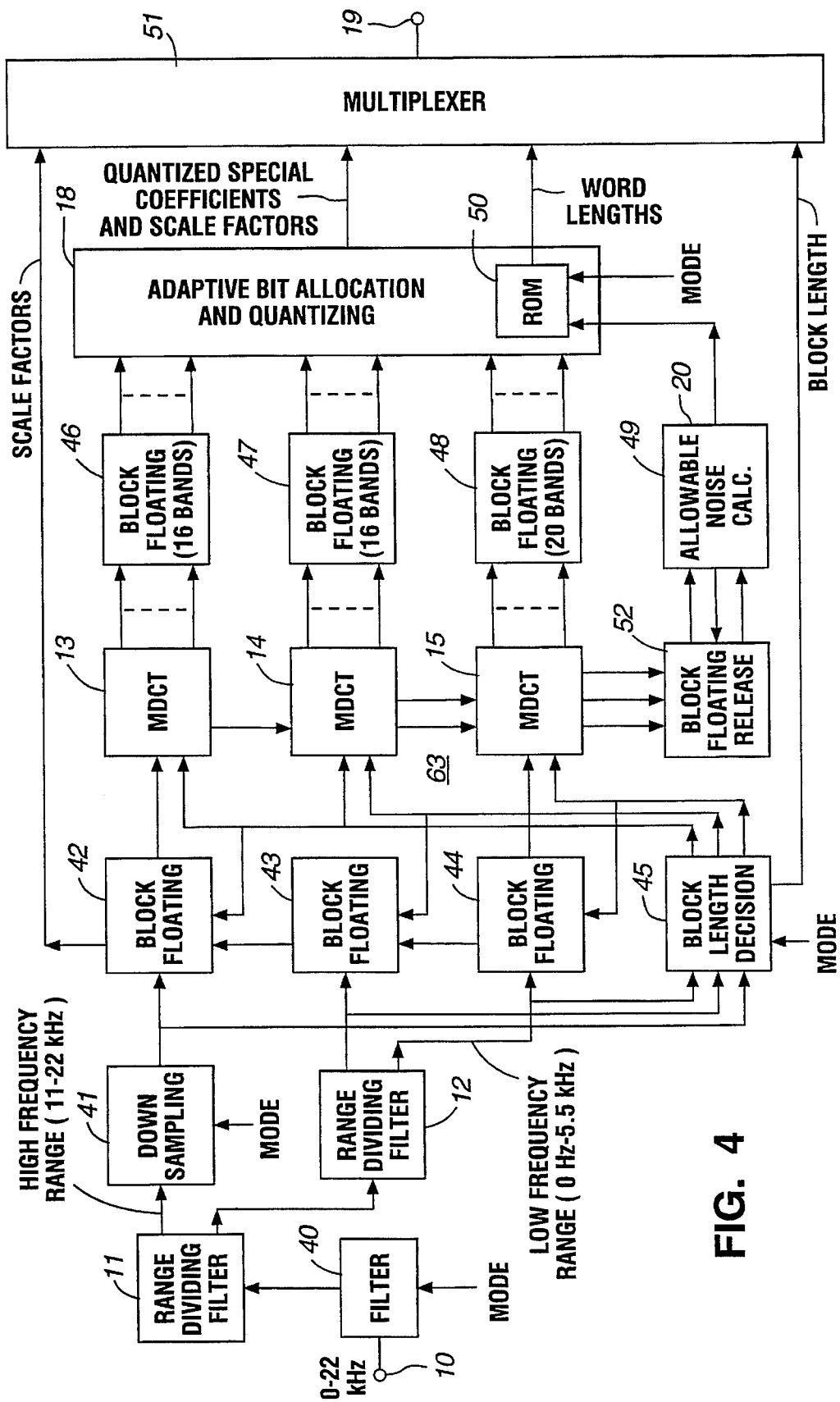
FIG. 4 is a block diagram showing a practical example of the encoder according to the invention for compressing a digital audio input signal.

In the encoder shown in FIG. 4, frequency range dividing filters divide the digital input signal in frequency into a frequency range signal in each of plural frequency ranges such that the bandwidths of the frequency ranges increase with increasing frequency, and the bandwidths of the two lower frequency ranges are the same. The frequency range signal in each frequency range is divided in time into blocks, and each block of each frequency range signal is orthogonally transformed to provide plural spectral coefficients in the frequency domain. The spectral coefficients are grouped by frequency into bands, and adaptive bit allocation is carried out to allocate the total number of available quantization bits among the bands. The spectral coefficients in each band are quantized using the number of quantizing bits allocated to the band.

The bands are critical bands, or sub bands obtained by dividing the critical bands towards higher frequencies further in frequency. Grouping the spectral coefficients into critical bands takes into account the frequency resolution characteristics of the human sense of hearing, as will be explained below. Dividing the critical bands towards higher frequencies into sub bands increases the efficiency of the block floating applied to each band.

(b) Time and Frequency Division

In the encoder 63, the frequency range filters 11 and 12 divide the digital input signal in frequency into a frequency range signal in each of plural frequency ranges.

Each frequency range signals is then divided in time into blocks to which block floating processing and orthogonal transform processing is applied. The block length decision circuit 45 adaptively determines the block length of the blocks in each of the frequency ranges according to dynamic characteristics of the digital input signal. The digital input signal is notionally divided in time into frames. Then, after the digital input signal is divided into plural frequency range signals, each frequency range signal is divided into the blocks in which the frequency range signal will be orthogonally transformed. Each block corresponds to a frame or an integral fraction (e.g., ½, ¼) of a frame. Thus, the maximum block length in which each frequency range signal is orthogonally transformed is equal to the frame length.

In the encoder 63, the block floating processing circuits 42, 43, and 44 apply block floating processing to the blocks of the frequency range signal in each frequency range. Block floating processing is a normalization process that reduces the number of bits required to represent, for example, the samples of the frequency range signal in a block with a given accuracy. This reduces the complexity of orthogonal transform circuitry. Block floating processing is preferably applied to each block of each frequency range signal, but may alternatively be applied to a subdivision of a block, or to plural blocks.

Additionally, in the encoder 63, the block floating processing circuits 46, 47, and 48 apply block floating processing to the spectral coefficients resulting from the orthogonal transform. Block floating processing can be applied to the spectral coefficients in a critical band, in a group of critical bands, or, in critical bands towards higher frequencies, in a sub-band obtained by dividing the critical band in frequency. In the embodiment shown, the block floating processing circuits 46, 47, and 48 apply block floating to bands corresponding to critical bands towards lower frequencies, and to bands corresponding to a fraction of a critical band at higher frequencies.

In FIG. 4, the digital audio input signal, a 16-bit PCM audio signal with a sampling frequency of 44.1 kHz and having a frequency range of 0 Hz to 22 kHz, is fed into the input terminal 10. The frequency range division filter 11 divides the digital audio input signal into a frequency range signal in the frequency range of 0 Hz through 11 kHz, and a frequency range signal in the high frequency range of 11 through 22 kHz. The frequency range division filter 12 further divides the signal in the frequency range of 0 Hz through 11 kHz into a frequency range signal in the low frequency range of 0 Hz through 5.5 kHz, and a frequency range signal in the middle frequency range of 5.5 through 11 kHz. Thus, the bandwidth of the low frequency range and that of the middle frequency range are equal. The frequency range division filters 11 and 12 are, e.g., quadrature mirror (QMF) filters. QMF filters are described in R. E. Crochiere, *Digital Coding of Speech in Subbands*, BELL SYST. TECH. J. Vol. 55, No. 8, 1976. A band division technique using equal bandwidth filters is described in Joseph H. Rothweiler, *Polyphase Quadrature Filters-A New Subband Coding Technique*, ICASSP 83, Boston 1983.

The frequency range signal in the high frequency range from the frequency range division filter 11 is fed into the orthogonal transform circuit 13. The frequency range signal in the middle frequency range from the frequency range division filter 12 is fed into the orthogonal transform circuit 14. The frequency range signal in the low frequency range from the frequency range division filter 12 is fed into the orthogonal transform circuit 15. The block floating processing circuits 42, 43, and 44 apply block floating to each block of the frequency range signal in the high frequency range, the middle frequency, and the low frequency range, respectively. The block length of each block is determined by the block length decision circuit 45.

In each orthogonal transform circuit, each block of each frequency range signal is orthogonally transformed from the time domain to provide plural spectral coefficients in the frequency domain. The orthogonal transform circuits 13, 14, and 15 are preferably modified discrete cosine transform (MDCT) circuits. Discrete cosine transform circuits or fast Fourier transform circuits could alternatively be used. A modified discrete cosine transform is described in J. P. Princen & A. B. Bradley, *SubBand/Transform Coding Using Filter Bank Designs Based on Time Domain Aliasing Cancellation*, ICASSP 1987 (1987).

(c) Block Lengths

Figure 5:
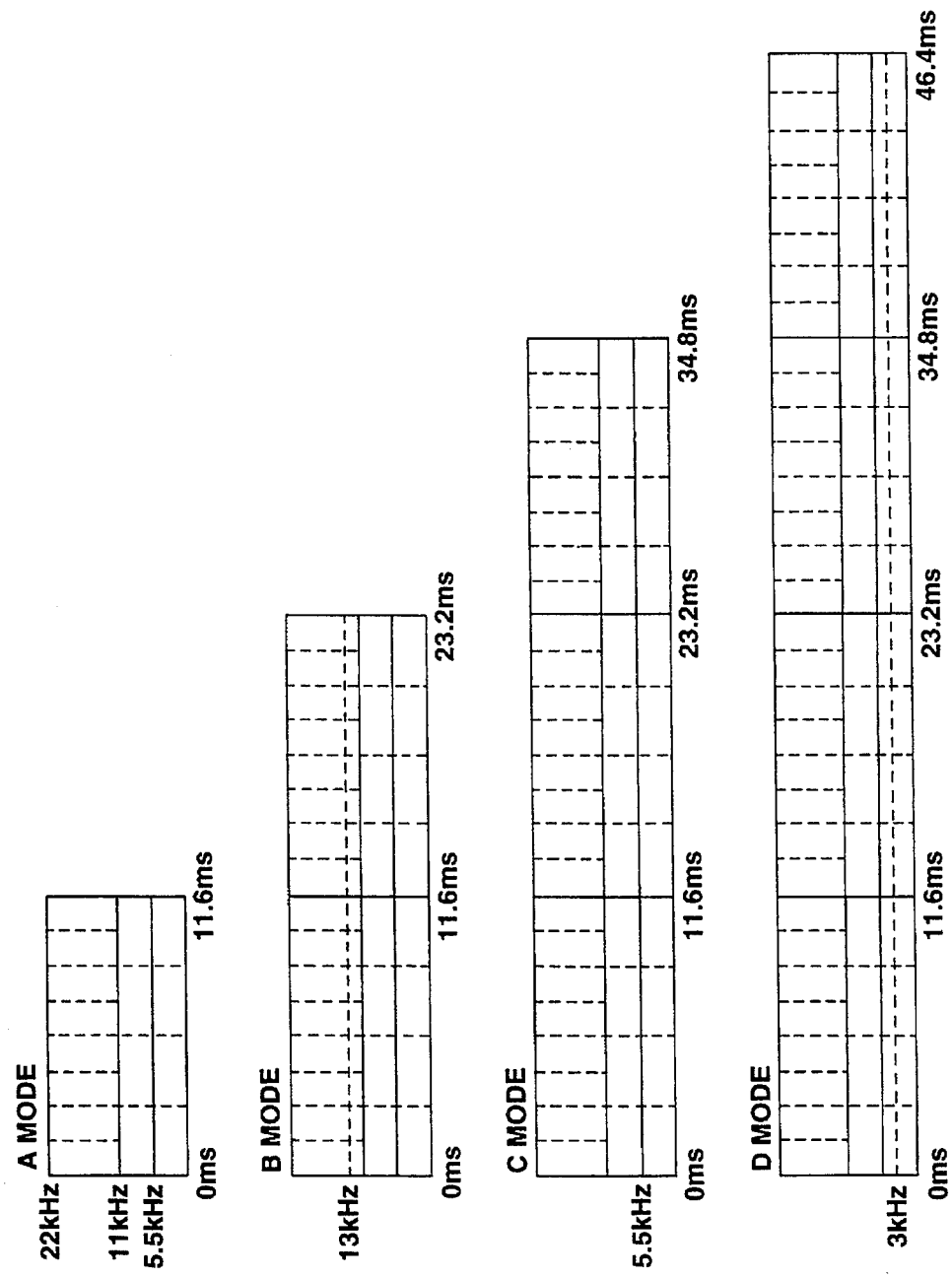
FIG. 5 shows the frame and block structure in which the frequency range signals derived from the digital audio input signal are processed in four different compression modes.

FIG. 5 shows practical examples of how the digital input signal is divided in frequency into frequency ranges, and is divided in time into frames in each of the compression modes A, B, C, and D, and how each frame of the frequency range signal in each frequency range is divided in time into blocks in each of the compression modes A, B, C, and D. The minimum number of blocks into which the frame of the frequency range signals can be divided is one. Thus, the maximum block length is equal to the frame length. The maximum number of blocks into which the frame of the frequency range signal in each frequency range in each compression mode may be divided is indicated by the vertical broken lines. The actual division into blocks depends on the dynamic properties of the digital input signal, as will be described below. In response to the compression mode signal, the block length decision circuit 45 increases the frame length or the maximum block length and the low-pass filter 40 reduces the bandwidth of the digital input signal when compression mode with a lower bit rate is selected.

In compression mode A, the block length decision circuit 45 sets the frame length to 11.6 ms, and the low-pass filter 40 sets the bandwidth of the digital input signal to 22 kHz. When the digital input signal is temporally quasi-static, the block length decision circuit 45 causes the frequency range signals to be divided in time such that the block lengths of all three frequency range signals are equal to the frame length, i.e., 11.6 ms. As the digital input signal becomes more dynamic, the block length decision circuit progressively reduces the block lengths. In the low and middle frequency ranges, the frequency range signals are divided in time such that each frame can be divided into as many as four blocks, each 2.9 ms long. In the high frequency range, the frequency range signal is divided in time such that each frame can be divided into as many as eight blocks, each 1.45 ms long.

The block length decision circuit progressively reduces the block length of each frequency range signal from the maximum block length, corresponding to the frame length, to the minimum block length. When the digital input signal is substantially static, the frequency range signal is divided into blocks having a block length equal to the frame length. As the digital input signal becomes progressively more dynamic, the frequency range signal is divided into blocks having a block length equal to one-half of the frame length, then into blocks having a block length equal to one-fourth of the frame length, etc., until the minimum block length is reached. Moreover, under certain dynamic conditions, such as a transient occurring during a frame, a frame of a frequency range signal may be divided asymmetrically. For example, the frame may be divided into a three blocks, one of which has a block length of one-half of the frame length, and two of which have a block length equal to one fourth of the frame length. Finally, the frequency range signals in one frame of the digital input signal may be divided into different numbers of blocks.

In compression mode B, the block length decision circuit 45 sets the frame length, and hence the maximum block length, to be twice that in compression mode A, i.e., to 23.2 ms, and the low-pass filter 40 reduces the upper bandwidth limit of the digital input signal to 13 kHz. When the digital input signal is temporally quasi-static, the block length decision circuit 45 causes all three frequency range signals to be divided in time into blocks having a block length equal to the frame length, i.e., 23.2 ms. As the digital input signal becomes more dynamic, the block length decision circuit progressively reduces the block lengths, as described above. In the low and middle frequency ranges, the frequency range signals are divided in time such that each frame can be divided into as many as eight blocks, each 2.9 ms long. In the high frequency range, the frequency range signal is divided in time such that each frame can be divided into as many as sixteen blocks, each 1.45 ms long.

Since the upper bandwidth limit of the digital input signal extends only to 13 kHz, the encoder 63 includes the down-sampling circuit 41 to down sample the frequency range signal in the high frequency range by a factor of two or four. This avoids needless signal processing at frequencies equal to and above the upper bandwidth limit.

In compression modes C and D, the block length decision circuit 45 further increases the frame length, to three times and four times, respectively, the compression mode A frame length. Also, the low-pass filter 40 further reduces the upper bandwidth limit of the digital input signal. However, the frame length and the upper bandwidth limit of the digital input need not be different in all the compression modes: some compression modes may use the same frame length and/or upper bandwidth limit. Even though the frame length is increased in the compression modes having lower bit rates, a short frame length, with blocks equal to or a fraction of the frame length, may be selectively used for encoding, to shorten the temporal processing delay.

(d) Masking, Critical Bands, and Quantizing Noise

The encoder according to the invention takes advantage of a psychoacoustic property of the human sense of hearing called "masking." Masking is a psychoacoustic phenomenon in which a signal or noise is rendered inaudible, or is "masked," by other signals occurring simultaneously with, or slightly earlier than, or later than, the signal or noise. Masking may be classified into time domain masking, in which masking provided by signals occurring earlier or later than the masked signal, and concurrent masking, in which masking is provided by simultaneously-occurring signals having a frequency different from the frequency of the masked signal.

Masking enables a signal to render inaudible any noise within its time or frequency masking range. This means that a digital encoding system that produces quantizing noise may have quantizing noise levels that are high compared with the noise level that is allowable in the absence of a signal, provided that the quantizing noise lies within the masking range of the signal. Since relatively high levels of quantizing noise are allowable if masked by the signal, the number of bits required to represent the signal, or parts of the signal, with an acceptably low level of quantizing noise may be significantly reduced.

A critical band is a measure of the range of frequencies that can be masked by a signal. A critical band is a band of noise that can be masked by a pure signal that has the same intensity as the noise, and has a frequency in the middle of the critical band. The bandwidth of successive critical bands increases with increasing frequency. The audio frequency range of 0 Hz to 22 kHz is normally divided into, e.g., 25 critical bands.

In this description of the invention, reference will occasionally be made to the quantizing noise of a compressed signal. The quantizing noise of a compressed signal is the quantizing noise in the analog signal resulting from expanding and D/A converting the compressed signal.

(e) Adaptive Bit Allocation

Returning now to FIG. 4, in the encoder 63, the spectral coefficients resulting from orthogonally transforming each frame of the digital input signal by the orthogonal transform circuits 13 through 15 are grouped together by frequency into bands. The bands towards lower frequencies correspond to critical bands, the bands towards higher frequencies correspond to critical bands further divided in frequency to increase the efficiency of the block floating processing applied to each band.

The spectral coefficients grouped into bands are fed to the block floating processing circuits 46, 47, and 48, which apply block floating processing to the spectral coefficients in each band. From the block floating processing circuits 46, 47, and 48, the spectral coefficients pass to the adaptive bit allocation and quantizing circuit 18. In the adaptive bit allocation and quantizing circuit, the spectral coefficients in each band are quantized using the number of bits allocated for quantizing the spectral coefficients in the band. The number of bits for quantizing the spectral coefficients in each band is determined by the adaptive bit allocation and quantizing circuit. The adaptive bit allocation and quantizing circuit allocates the total number of bits available for quantizing the spectral coefficients among the bands in response to the allowable noise level calculating circuit 20.

The allowable noise calculating circuit 20 receives the spectral coefficients from the orthogonal transform circuits 13, 14, and 15 via the block floating release circuit 52, which releases the block floating processing applied by the block floating processing circuits 42, 43, and 44. The allowable noise calculating circuit determines the allowable noise level for each band, taking into account masking effects. The allowable noise level calculating circuit 20 also calculates the difference between the energy or peak signal amplitude in each band and the allowable noise level in each band and feeds this information to the adaptive bit allocation and quantizing circuit 18. From this information, the adaptive bit allocation and quantizing circuit 18 determines the number of bits to allocate to each band for quantizing the spectral coefficients in the band, and re-quantizes the spectral coefficients in each band using to the number of bits allocated to the band. The spectral coefficients, re-quantized as just described, are supplied to the multiplexer 51 as the main information of the compressed signal fed from the multiplexer to the output terminal 19.

(f) Allowable Noise Calculating Circuit

Figure 6:
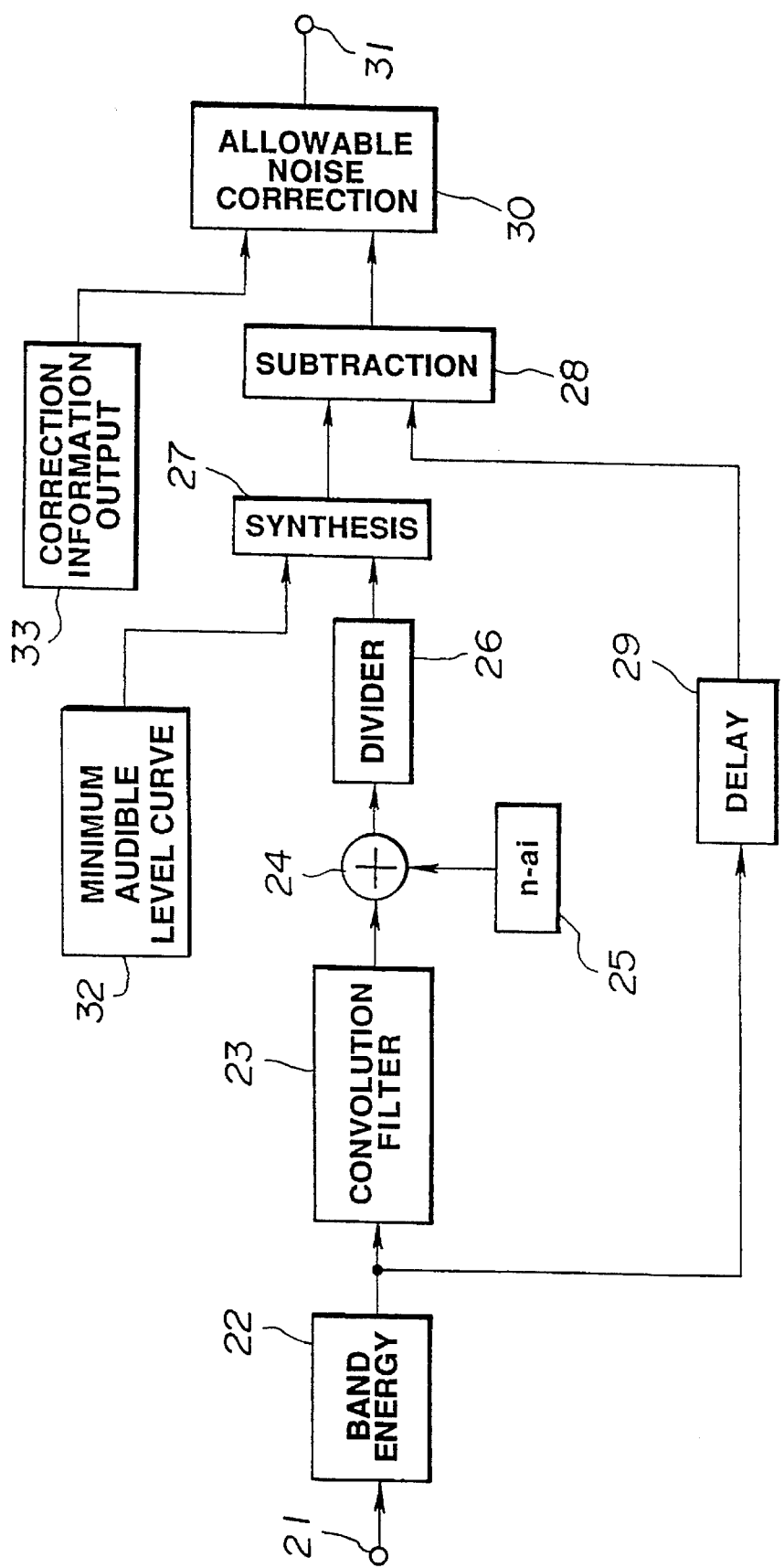
FIG. 6 is block diagram of the allowable noise calculation circuit 20 shown in FIG. 4.
Figure 7:
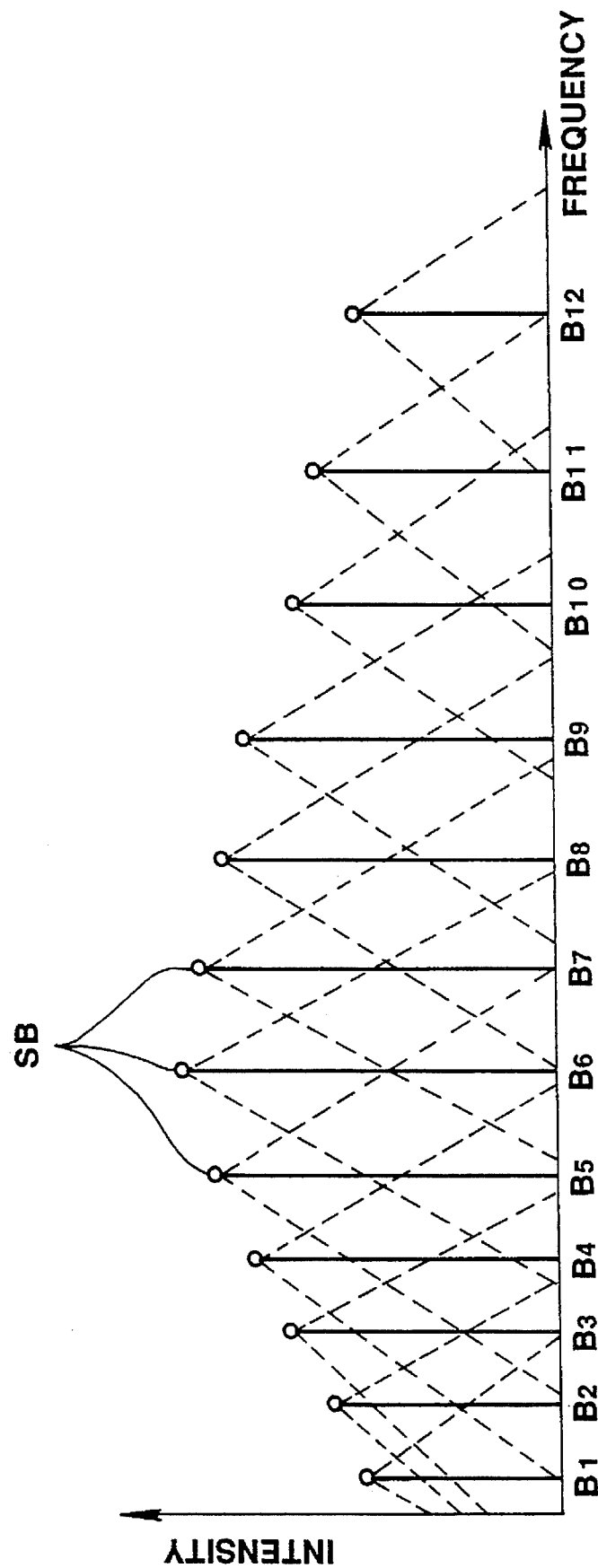
FIG. 7 shows a simplified bark spectrum, and the masking range of each band.

FIG. 6 is a block diagram of a practical example of the allowable noise calculating circuit 20. The spectral coefficients from the orthogonal transform circuits 13 through 15 (FIG. 4) are fed via the block floating release circuit 52 (FIG. 4) and the input terminal 21 to the band energy calculating circuit 22. The band energy calculating circuit determines the energy in each critical band by calculating the sum of the amplitudes of the spectral coefficients in the band. The band energies can also be calculated by a root-mean-square calculation using the spectral coefficients. The peak or mean values of the amplitudes of the spectral coefficients may be used instead. The output of the band energy calculating circuit 22 is a spectrum of the energy in each critical band, and is called a bark spectrum. FIG. 7 shows such a bark spectrum SB of the energies in twelve successive critical bands. The figure only shows twelve critical bands, $B_1$ through $B_{12}$, for simplicity.

To take account of the effect of the bark spectrum SB on masking, convolution processing is carried out in which the bark spectrum is multiplied by predetermined weighting coefficients and the resulting products are summed. The convolution processing calculates the sum of the effects of the energies in the neighboring critical bands on the masking level in each critical band. These are indicated by the broken lines in FIG. 7.

The outputs of the band energy calculating circuit 22, i.e., the values of the bark spectrum SB, are supplied to the convolution filter circuit 23. The convolution filter circuit 23 includes plural delay elements for sequentially delaying the input bark spectrum. The convolution filter also includes plural multipliers, each of which multiplies the output of one delay element by a weighting coefficient. Preferably, 25 delay elements and 25 multipliers are used, one for each critical band. As a practical example of the weighting coefficients in the multipliers of the convolution filter circuit 23, if the weighting coefficient of the multiplier M of a given critical band is 1, the outputs of the respective delay elements are multiplied by 0.15, 0.0019, 0.000086, 0.4, 0.06 and 0.007 by the multipliers M−1, M−2, M−3, M+1, M+2 and M+3, respectively. M is an arbitrary number between 1 and 25. Finally, the convolution filter circuit includes an adder for summing the outputs of the multipliers.

The output of the convolution filter circuit 23 is supplied to the adder 24 to determine the level $\alpha$ corresponding to the allowable noise level in the convoluted region. The level $\alpha$ is the level that gives the allowable noise level for each critical band by deconvolution, as will be described below. A masking function, representing the masking level, for finding the level $\alpha$ is supplied to the subtractor 24. The level $\alpha$ is controlled by increasing or decreasing the masking function. The masking function is supplied by the (n−ai) generator 25, which will be described next.

The level $\alpha$ corresponding to the allowable noise level is determined by:

$$\alpha = S - (n - ai) \quad (1)$$

where i is the number of the critical band and 1 is the number of the lowest frequency critical band, n and a are constants, a is greater than 0, S is the intensity of the convoluted bark spectrum, and (n−ai) is the masking function. In the example of FIG. 6, no deterioration in sound quality is obtained with n=38 and a=1.

The level $\alpha$ is determined in the subtractor 24, and the result is fed into the divider 26, which deconvolutes the level $\alpha$ in the convoluted region. Thus, by deconvolution, the masking spectrum may be found from the level $\alpha$. That is, the masking spectrum becomes the allowable noise level. Although deconvolution normally requires complex processing, it is carried out in the example shown in FIG. 6 by the simple divider 26.

Figure 8:
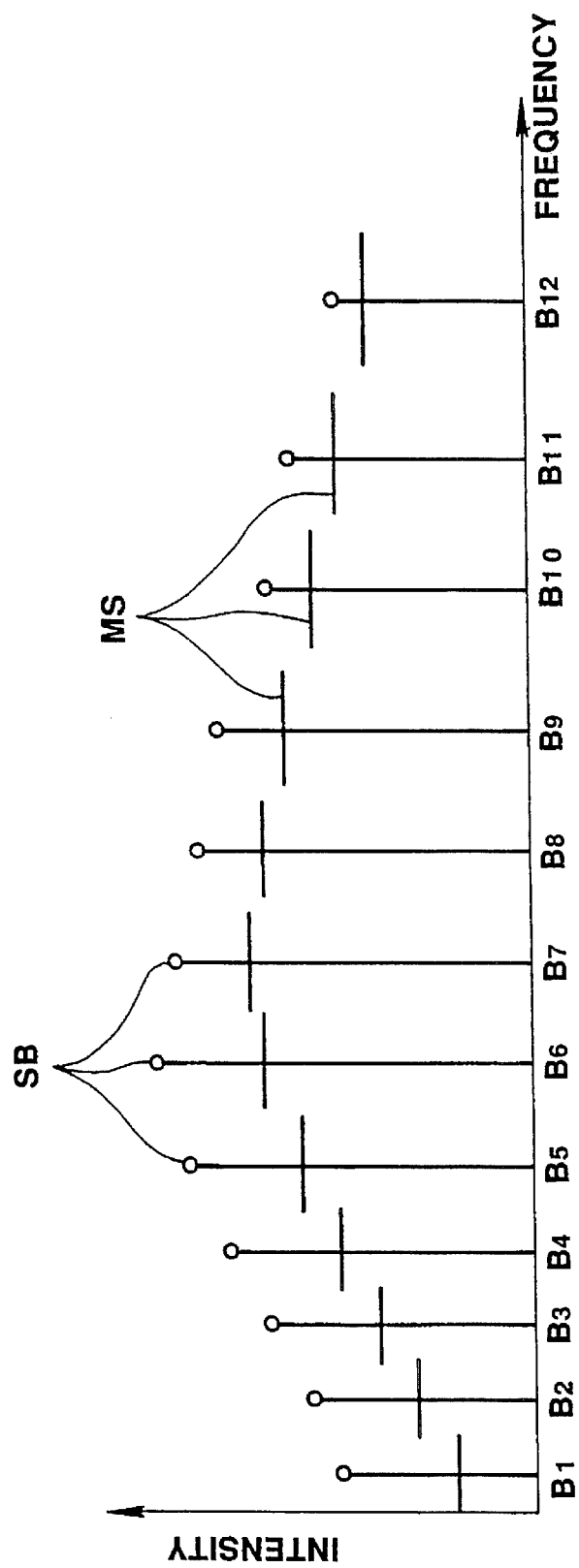
FIG. 8 shows a masking spectrum.

The masking spectrum is transmitted to the subtractor 28 through the synthesis circuit 27. The subtractor 28 also receives the output of the band energy calculating circuit 22, i.e., the bark spectrum SB, via the delay circuit 29. The subtractor 28 subtracts the masking spectrum from the bark spectrum SB, and the part of the bark spectrum below the level indicated by the masking spectrum MS is masked, as shown in FIG. 8.

The output of the subtractor 28 is fed via the allowable noise correction circuit 30 and the output terminal 31 to the adaptive bit allocation and quantizing circuit 18, which includes the ROM 50, in which, e.g., plural pre-allocated bit allocation patterns are stored. In response to the difference between the energy in each band and the allowed noise level for each band obtained via the allowed noise correction circuit 30 from the subtractor 28 in the allowed noise level calculating circuit, the ROM 50 selects one of the pre-allocated bit allocation patterns and reads out an allocated bit number for each band. The adaptive bit allocation and quantizing circuit then requantizes the spectral coefficients from the orthogonal transform circuits 13, 14, and 15 in each band using the allocated bit number for the band.

To summarize, the adaptive bit allocation and quantizing circuit 18 quantizes the spectral coefficients in each band using the number of bits allocated in accordance with the difference between the energy or peak value in the band and the allowed noise level for the band.

The delay circuit 29 is provided to delay the bark spectrum SB from the energy calculating circuit 22 to take account of the delays in the circuits preceding the synthesis circuit 27.

Figure 9:
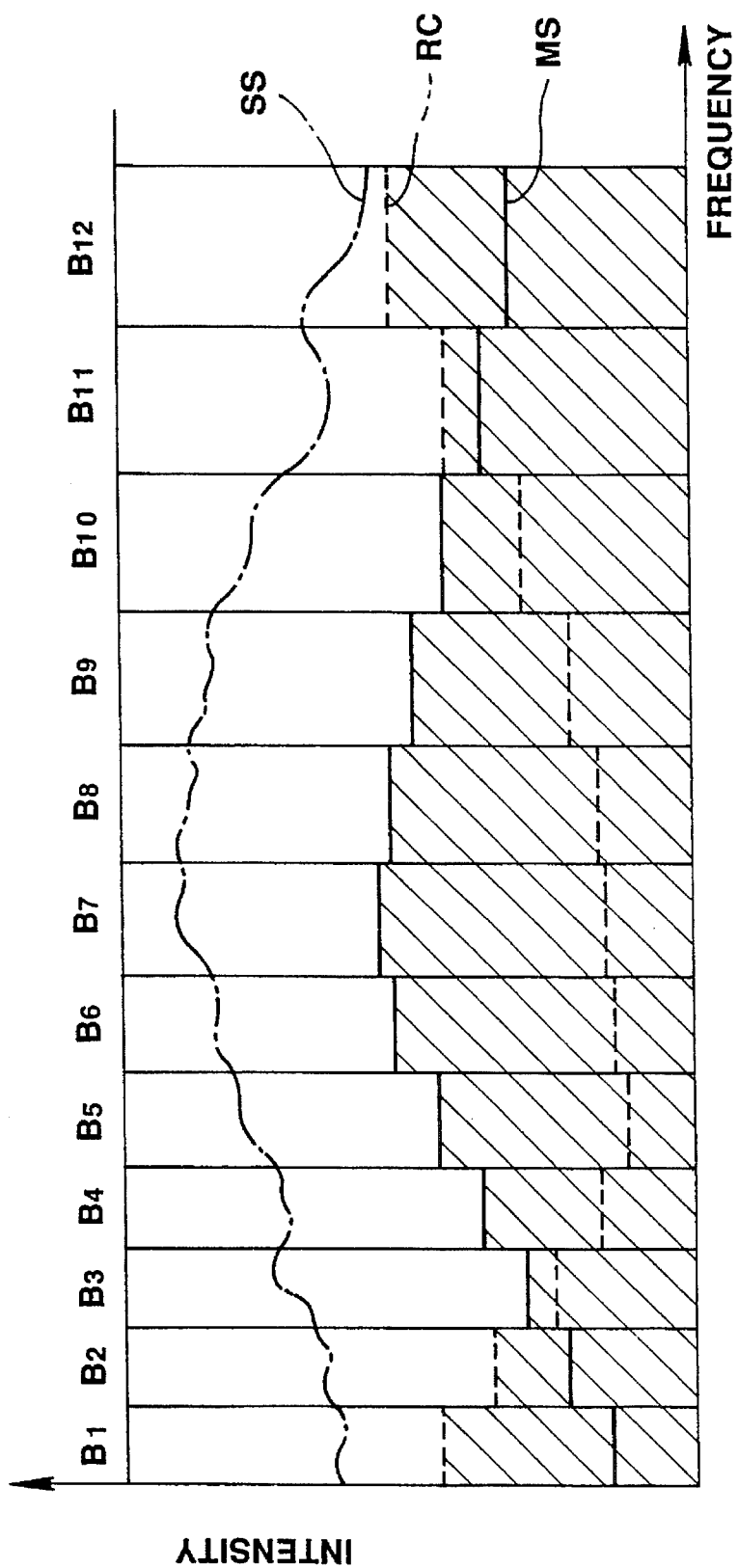
FIG. 9 shows a synthesis of the minimum audible level curve and the masking spectrum.

The synthesis circuit 27 synthesizes the masking spectrum MS and data indicating the so-called minimum audible level curve RC, which characterizes another characteristic of the human sense of hearing. This synthesis is depicted in FIG. 9. The data indicating the minimum audible level curve are provided by the minimum audible level curve generator 32. According to the minimum audible level curve, noise having an absolute level below the minimum audible level curve cannot be heard. The minimum audible level curve varies, depending upon, e.g., the acoustic level at which the output signal is reproduced. However, in a practical digital audio system, there are not great differences in the ways in which the dynamic range of music can be fit into, e.g., the dynamic range provided by a 16-bit digital system. Accordingly, if the quantizing noise level is inaudible in the frequency band in which the ear is most sensitive, i.e., in the vicinity of 4 kHz, it can be assumed that quantizing noise below the level of the minimum audible level curve cannot be heard in other frequency bands.

Accordingly, assuming that the system is used in a way such that, e.g., the noise level produced by the word length of the system in the vicinity of 4 kHz is inaudible, then, when the minimum audible level curve RC and the masking spectrum MS are synthesized to provide the allowable noise level, the allowable noise level can be as high as the shaded portion in FIG. 9. It is to be noted that, in this embodiment, the level at 4 kHz of the minimum audible level curve is set to correspond to the minimum level corresponding to quantizing using, e.g., 20 bits. The signal spectrum SS is also shown in FIG. 9.

The allowable noise correction circuit 30 corrects the allowable noise level at the output of the subtractor 28 using, e.g., the equal-loudness curve provided by the correction information output circuit 33. The equal-loudness curve is a yet another characteristic of the human sense of hearing. The equal-loudness curve characterizes the sound pressure levels of sounds at various frequencies that are heard with the same intensity as that of a pure sound of 1 kHz. The equal-loudness curve is substantially similar to the minimum audible level curve RC, shown in FIG. 9. According to the equal-loudness curve, for example, a sound in the vicinity of 4 kHz sounds as loud as a sound at 1 kHz with a sound pressure level about 8 to 10 dB higher. On the other hand, a sound at about 50 Hz must have a sound pressure level about 15 dB higher than the sound at 1 kHz to sound as loud.

Accordingly, it is desirable that the allowable noise level be given the frequency characteristic given by a curve corresponding to the equal-loudness curve. Correcting the allowable noise level to take account of the equal-loudness curve further takes account of the characteristics of the human sense of hearing.

The correction information output circuit 33 may also be used to correct the allowable noise level in response to information indicating the difference between the number of bits used by the adaptive bit allocation and quantizing circuit 18 (FIG. 4) for quantizing the spectral coefficients, and the target bit rate of the compressed signal. This correction is required because an error may exist between the total number of bits allocated in an advance bit allocation by the adaptive bit allocation and quantizing circuit 18 and the number of bits corresponding to the target bit rate of the compressed signal. Therefore, the bit allocation must be repeated to reduce the error to zero. The second bit allocation is carried out such that, when the total number of allocated bits is less than the target value, a number of bits equal to the difference is distributed among the bands to add to the bits already allocated. On the other hand, when the total number of allocated bits is greater than the target value, a number of bits equal to the difference is distributed among the bands for removal from the bits already allocated.

To carry out this operation, the error between the target value and the total number of bits allocated is detected. The correction information output circuit 33 then generates correction data for correcting the allowable noise level to change the allocated bit numbers in response to the error. When the error indicates a shortage in the number of allocated bits, a greater number of bits must be used per band. On the other hand, when the error indicates an excess in the number of allocated bits, fewer bits must be used per band.

Accordingly, the correction information output circuit 33 provides to the allowable noise level correction circuit 30 a correction value for correcting the allowable noise level from the output of the subtractor 28, e.g., according to the equal-loudness curve, and the bit allocation error. Thus, the allowable noise level from the subtractor 28 is corrected.

The allowable noise level calculating circuit 20 may be simplified by omitting the minimum audible level curve generating circuit 32 and the synthesis circuit 27, and feeding the output directly from the divider 26 to the subtractor 28.

Further, there are a variety of alternative bit allocation methods which may alternatively be used. Among these methods are fixed bit allocation, simple bit allocation in response to the energy in each band of the signal, or a combination of fixed bit allocation and variable bit allocation.

The encoder 63 generates the spectral coefficients, quantized in bands using an adaptively-allocated number of quantizing bits, as described above, as main information in the compressed signal. The compressed signal additionally includes sub information. The sub information includes the scale factors generated in the block floating processing applied to each block and to each band, data indicating the block length in each frequency range (or the number of blocks into which each frame of each frequency range signal is divided) and a quantizing word length for each band, indicating the number of bits used to quantize which each spectral coefficient in the band. The main information and the sub information are multiplexed by the multiplexer 51 to provide the compressed signal, which is fed out via the terminal 19.

4. COMPRESSION MODE SELECTION

The manner in which the encoder according to the invention provides multiple compression modes having different bit rates and different upper bandwidth limits will now be described with reference to an example of an encoder that is switchable between compression mode A and compression mode B.

Figure 12:
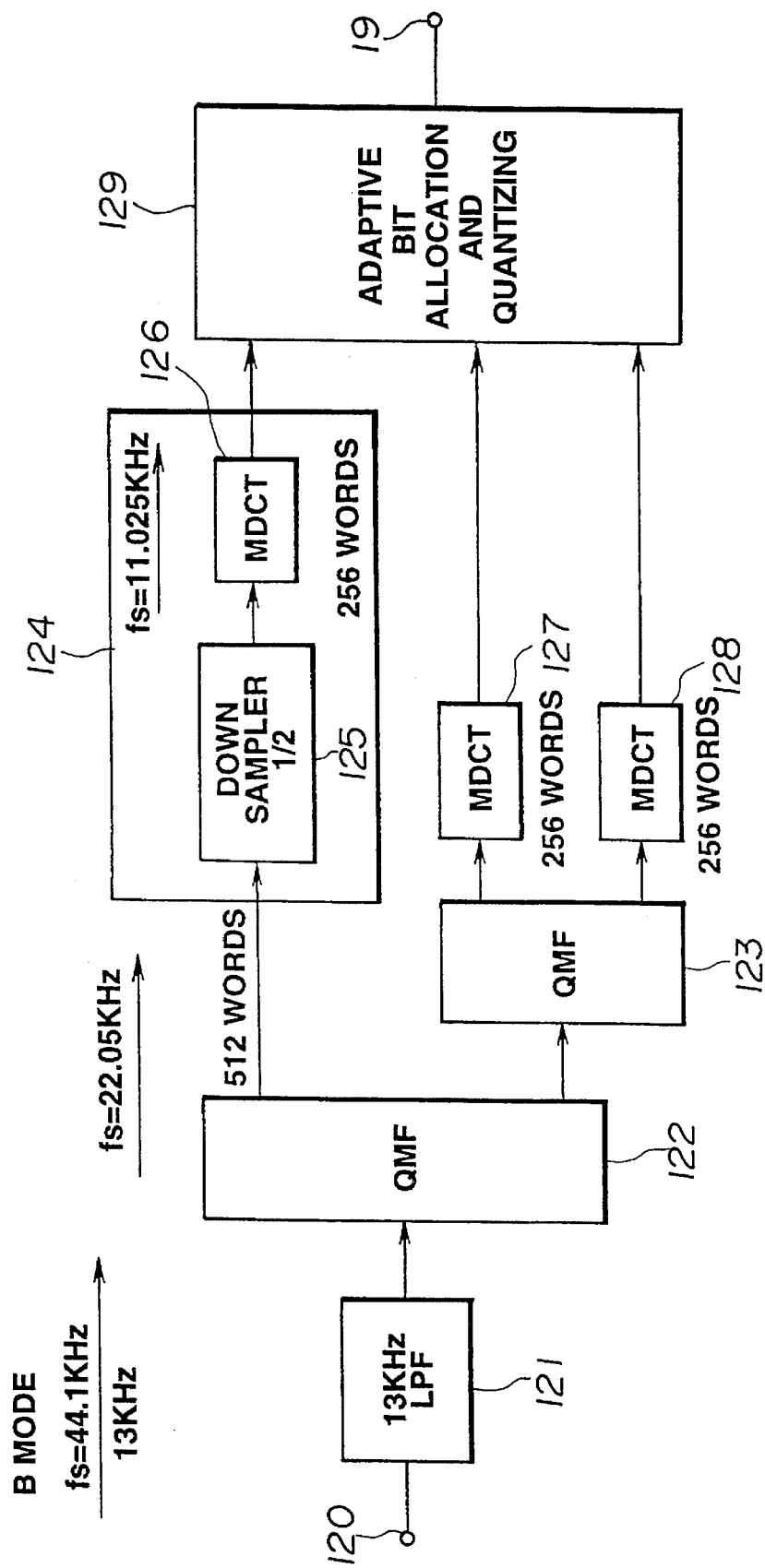
FIG. 12 is a simplified block diagram of the encoder according to the invention showing details of the downsampling.

The encoder according to the invention receives the digital input signal at the same sampling frequency in all compression modes, and encodes the digital input signal using a selected one of plural compression modes. The circuit structure of the encoder according to the invention is shown in FIG. 4. In the encoder shown in FIG. 4, the low-pass filter 40 has a cut-off frequency that is switchable in response to the compression mode signal MODE if the encoder operates in a compression mode in addition to compression mode A. The block length decision circuit 45 operates in response to the MODE signal to increase the frame length, and hence the maximum block length, when a lower bit rate compression mode is selected. The encoder also includes the down sampling circuit 41, more details of which are shown in FIG. 12, which operates in response to the MODE signal. The ROM 50 in the adaptive bit allocation and quantizing circuit 18 stores a set of bit allocation pattern for each compression mode. Each set of bit allocation patterns is selected by the MODE signal, and allocates among the bands the number of quantizing bits according to the bit rate of the compression mode. The bit allocation patterns for compression modes B, C, and D allocate no bits to the bands above the upper bandwidth limit of the compression mode, i.e., to the bands above 13 kHz, 5.5 kHz, and 3 kHz, respectively.

In an encoder capable of operating in more than one of the above-described compression modes, the parameters described above are changed in response to the MODE signal. In an encoder capable of operating in only one of the above-described compression modes, the above-mentioned parameters are set according to the compression mode in which the encoder operates.

Figure 10:
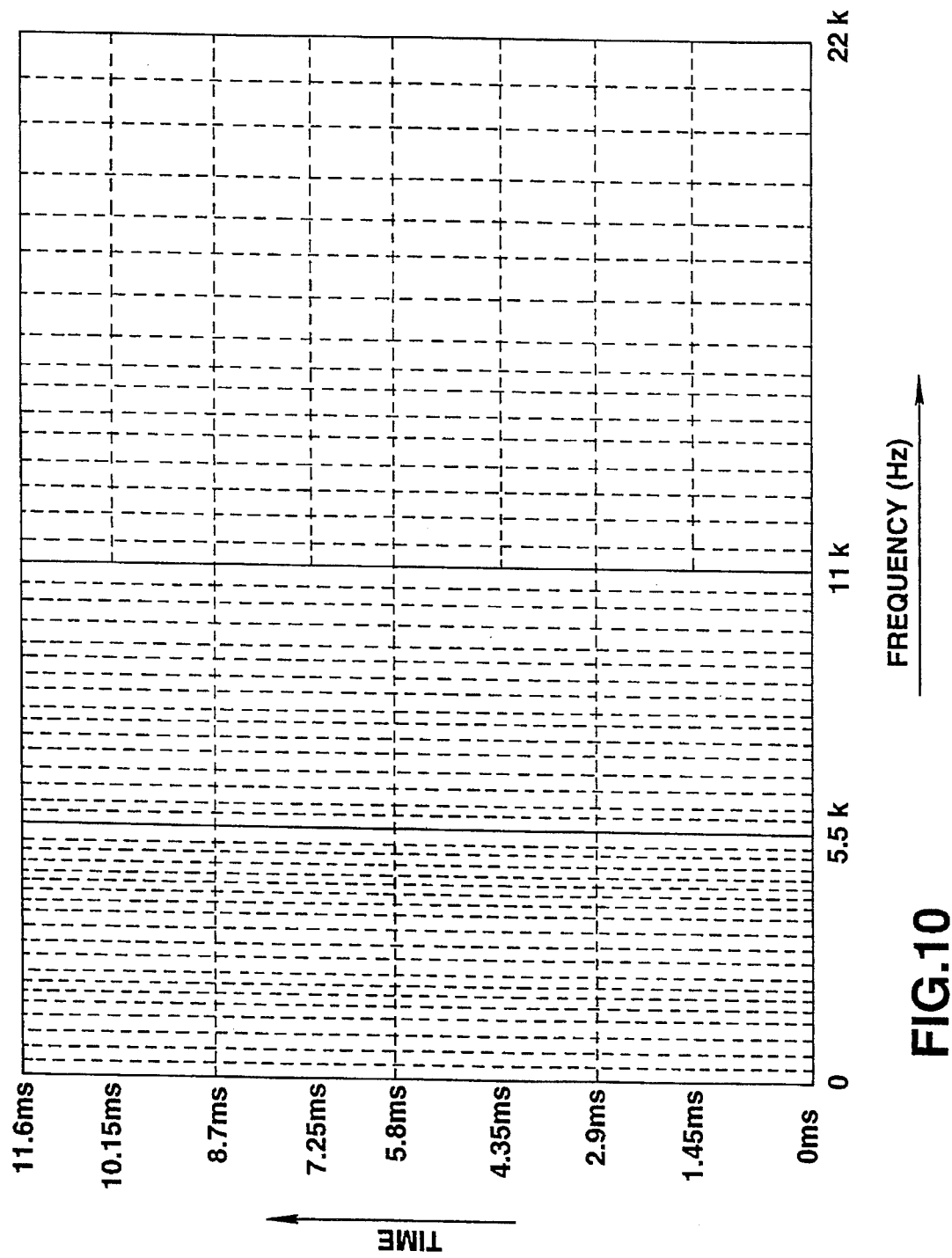
FIG. 10 shows how a frame of 11.6 ms is divided in frequency and in time into 52 bands in consideration of the bandwidths of the critical bands and the efficiency of the block floating processing applied to the bands.

The encoder operates similarly in all the compression modes, but the block length decision circuit 45 sets a different frame length in each compression mode. The different frame lengths are multiples of the compression mode A frame length, as shown in FIG. 5. In compression mode A, the digital input signal is compressed in frames having a frame length of 11.6 ms, as shown in FIG. 10, and the division of each frequency range signal in time into blocks is carried out using the compression mode A frame length of 11.6 ms. In compression modes B, C, and D, the block length decision circuit 45 sets the frame length to twice, three times, and four times the frame length of compression mode A.

When a compression mode with a lower bit rate and a lower bandwidth is selected, the encoder according to the invention increases the maximum block length by increasing the frame length. This not only increases the amount of main information in the compressed signal, but also increases the frequency resolution of the orthogonal transform at the expense of decreasing the temporal resolution. Increased frequency resolution is desirable because reducing the bit rate reduces the number of quantizing bits available, which increases the quantizing noise. On the other hand, temporal resolution becomes less important because the upper frequency limit of the digital input signal is reduced. Moreover, since the frame length represents the maximum block length subject to orthogonal transform processing, the block length decision circuit 45 can divide the frames into blocks as short as 1.45 ms to provide adequate temporal resolution when this is needed, irrespective of the frame length.

Processing the frequency range signals in blocks as long as 46.4 ms (1024 samples) requires a large amount of memory. Some of the benefits of using large blocks may be had without processing large blocks by orthogonally transforming each frequency range signal in compression mode A frames, and then forming large blocks of the spectral coefficients resulting from orthogonally transforming two, three or four compression mode A frames of the frequency range signals in compression modes B, C, and D.

For example, in compression mode B, the encoder first determines whether two consecutive compression mode A frames have been orthogonally transformed with a block length equal to the compression mode A frame length. If this condition is met, the encoder next determines whether the scale factors and the word lengths of the two consecutive frames are the same. If this condition is also met, the scale factors and word lengths of the two consecutive frames are made common to the two frames. This reduces the amount of sub information required, and allows the amount of the main information in compression mode B to be increased. This reduces the impairment of the sound quality due to reducing the bit rate.

When the digital input signal is compressed in compression mode A in blocks having a block length equal to the frame length, i.e., 11.6 ms, the resulting spectral coefficients in the frequency range of 0 Hz to 22 kHz are grouped by frequency into 52 bands, as indicated by the vertical broken lines in FIG. 10. At low and middle frequencies, the bands correspond to critical bands; at high frequencies, the bands correspond to fractions of critical bands to increase the efficiency of the block floating processing applied to the bands. Of the 52 bands, 20 are in the low frequency range (0 Hz to 5.5 kHz), 16 are in the middle frequency range (5.5 kHz to 11 kHz), and 16 are in the high frequency range (11 kHz to 22 kHz).

When the block length decision circuit 45 (FIG. 4) causes the length of a block to be halved, the number of spectral coefficients resulting from orthogonally transforming each block of a frequency range signal is also halved, and the frequency spacing of the spectral coefficients is doubled. In the higher frequency bands, where the grouping of the spectral coefficients into bands is made in consideration of the efficiency of the block floating processing applied to each band, the bandwidth of each band is doubled, which halves the number of bands towards higher frequencies. This keeps the total number of bands towards higher frequencies derived from each frame of the frequency range signal constant, irrespective of the number of blocks into which each frame is divided. This avoids an increase in the amount of sub information generated when a frame is orthogonally transformed as more than one block.

Figure 11:
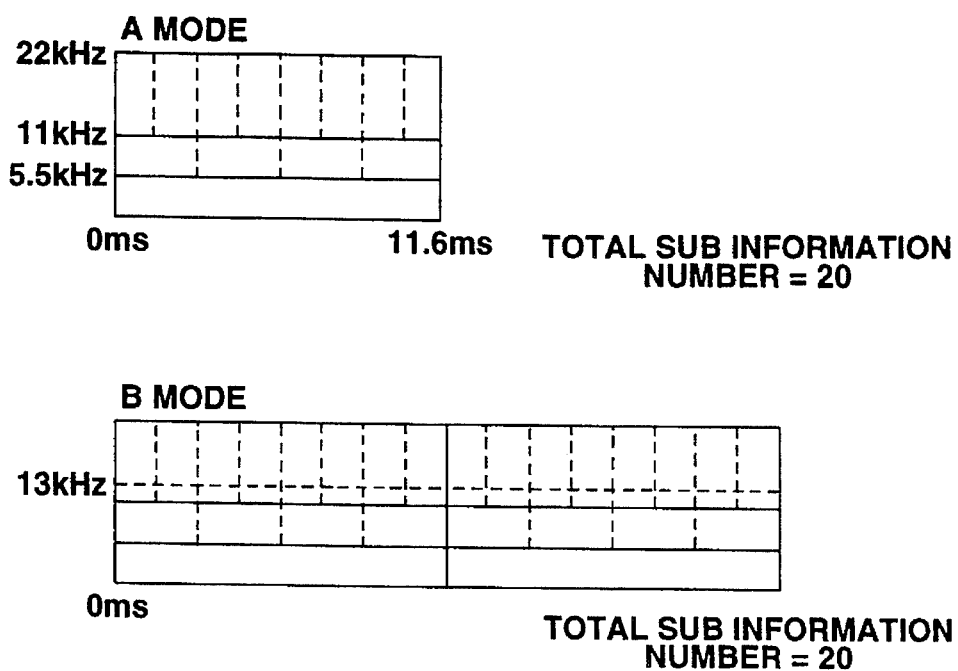
FIG. 11 illustrates how the frame length for mode B is increased compared with that of mode A on account of the reduced the bandwidth and bit rate of mode B.

Referring to FIG. 11, in compression mode A, the sub information includes the scale factor and the word length for the 20 bands in the low frequency range for each frame of 11.6 ms, whereas in compression mode B, the sub information includes the scale factor and the word length for the 20 bands in the low frequency range for each frame of 23.2 ms.

In compression mode A shown FIG. 11, when the digital input signal is such that the block length is one half of the frame length in the mid frequency range and the high frequency range, the width of each band is doubled, which halves the amount of sub-information. That is, both the middle frequency range and the high frequency range, the sub information includes the scale factor and the word length for 8 bands for each frame of 11.6 ms. The additional processing operations required to achieve this are insignificant compared with the total number of processing operations in the compression process.

Some additional details of bandwidth reduction in the compression modes with a low bit rate will now be described with reference to FIG. 12. FIG. 12 is a simplified version of FIG. 4 for illustrating bandwidth reduction.

FIG. 12 shows a practical arrangement for performing bandwidth reduction in compression mode B. Referring to FIG. 12, the digital input signal with a sampling frequency of 44.1 kHz is fed via the input terminal 120 to the low-pass filter 121. The cut-off frequency of the low-pass filter reduces the upper bandwidth limit of the digital input signal to that of compression mode B. For example, in compression mode B, the low-pass filter 121 reduces the upper bandwidth limit of the digital input signal to 13 kHz. The bandwidth-limited signal from the low-pass filter 121 passes to the frequency range division filters 122 and 123, which are similar to the frequency range division filters 11 and 12 shown in FIG. 4, and are preferably quadrature mirror (QMF) filters.

In compression mode B, the frequency range signals in the low and middle frequency ranges from the frequency range filter 123 are notionally divided into frames, are divided into blocks corresponding to a frame or a fraction of a frame, and block floating processing is applied. The processed blocks are then orthogonally transformed by the orthogonal transform circuits 127 and 128 in a manner similar to the way in which the blocks are orthogonally transformed in compression mode A.

The frequency range signal in the high frequency range is fed from the frequency range dividing filter 122 to high frequency range processing circuit 124. In the high frequency range processing circuit, the high frequency range signal is fed into the down sampling circuit 125, where it is down sampled by a factor of two. The resulting down-sampled frequency range signal, in which the number of samples in each frame is halved, is divided into blocks, each corresponding to a frame or a fraction of a frame. The blocks are then orthogonally transformed by the orthogonal transform circuit 126.

The spectral coefficients from the orthogonal transform circuits 126 through 128 are fed into the adaptive bit allocation and quantizing circuit 129, which is similar to the adaptive bit allocation and quantizing circuit 18 shown in FIG. 4, with the exception of the bit allocation patterns stored in the ROM (not shown), as described above. The quantized spectral coefficients are fed to the output terminal 19 via a multiplexer (not shown).

Alternatively, the high frequency range signal processing circuit 124 can implement down sampling by a factor of four. As a further alternative, if a bandwidth extending to 11 kHz is acceptable in compression mode B, the high frequency range signal processing circuit 124 may be omitted altogether. In addition, in the bit allocation patterns for this alternative compression mode B, no quantizing bits are allocated to bands above 11 kHz.

Although the encoder according to the invention is described herein as generating a compressed signal from which a recording signal for recording on a magneto-optical disc or an IC card is derived, signals suitable for transmission or for distribution via suitable media such as broadcast, cable, telephone, ISDN, etc. may also be derived from the compressed signal. Accordingly, references herein to a recording signal and a recording medium are to be taken also to refer to signals for transmission or distribution via any medium.

Figure 13:
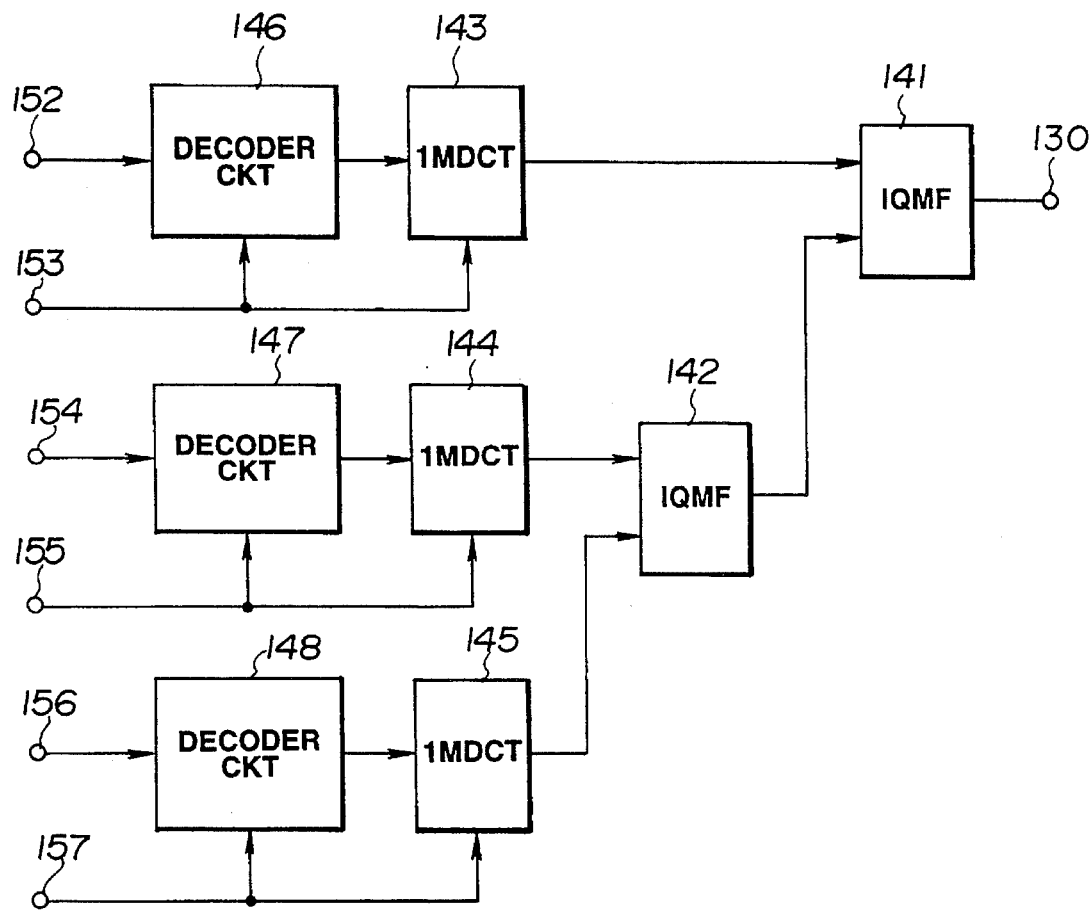
FIG. 13 is a block circuit diagram showing a practical example of a decoder for expanding a compressed recording signal generated by an encoder according to the invention.

FIG. 13 is a block diagram of the decoder corresponding to the encoder of the present embodiment. In FIG. 13, the input terminals 152, 154, and 156 are supplied with the quantized spectral coefficients generated by the encoder, and the input terminals 153, 155, 157 are supplied with the sub information from the encoder. The quantized spectral coefficients and the sub information are extracted from the compressed signal reproduced from the recording medium by a suitable demultiplexer (not shown).

The quantized spectral coefficients and the sub information are fed into respective inverse quantizing circuits 146, 147, and 148, where the quantizing and the block floating applied to each band of spectral coefficients are reversed using the sub-information. The resulting spectral coefficients are then grouped by frequency into three frequency ranges corresponding to the three frequency ranges in the encoder, and are fed into the inverse orthogonal transform circuits 143, 144, and 145. These circuits apply inverse orthogonal transform processing, such as inverse discrete cosine transform processing, complementary to the orthogonal transform processing applied by the orthogonal transform processing circuits 13, 14, and 15 in the encoder. The inverse orthogonal transform circuits 143, 144, and 145 are also supplied with sub-information so that the block floating applied by the block floating processing circuits 42, 43, and 44 in the encoder can be released. Three frequency range signals are assembled in the time domain from the blocks of time domain samples generated by each of the three inverse orthogonal transform circuits 143, 144, and 145. The three frequency range signals are fed to the inverse quadrature mirror filters 142 and 141, where they are synthesized to provide the digital audio output signal. The digital audio output signal is fed to the output terminal 130.

If down sampling is applied to the frequency range signal in the high frequency range in the encoder, an upsampling circuit (not shown) must be included in the decoder between the output of the inverse orthogonal transform circuit 143 and the input of the inverse quadrature mirror filter 141.

Although illustrative embodiments of the invention have been described herein in detail, it is to be understood that the invention is not limited to the precise embodiments described, and that various modifications may be practiced within the scope of the invention defined by the appended claims.

I claim:

1. Apparatus for deriving a compressed digital signal from a digital input signal by compressing the digital input signal in a selected one of at least two compression modes, the digital input signal being compressed with a different compression ratio in each of the at least two compression modes, the compressed digital signal having a bit rate, the bit rate of the compressed digital signal being different in each of the compression modes, the apparatus comprising:

receiving means for receiving the digital input signal at a fixed sampling frequency, the sampling frequency being invariable between the compression modes;

a low-pass filter having a cut-off frequency set according to the selected one of the compression modes, the low-pass filter receiving the digital input signal and providing a bandwidth-limited signal having a bandwidth defined by the cut-off frequency of the low-pass filter; and compressor means for deriving the compressed digital signal from the bandwidth-limited signal.

2. The apparatus of claim 1, wherein:

the apparatus additionally comprises block dividing means for dividing the bandwidth-limited signal in time into blocks, each block having a block length, the block lengths of the blocks having a maximum block length depending on the selected one of the compression modes; and the compressor means derives the compressed digital signal from the blocks of the bandwidth-limited signal.

3. The apparatus of claim 1, wherein the compressor means includes:

frequency dividing means for deriving spectral coefficients from the bandwidth-limited signal; and quantizing means for quantizing the spectral coefficients grouped by frequency into bands, the bands having a wider bandwidth towards higher frequencies.

4. The apparatus of claim 3, wherein:

the quantizing means includes a bit allocating means for allocating among the bands quantizing bits for quantizing the spectral coefficients in each band, the bit allocating means allocating no quantizing bits to bands having a frequency above the cut-off frequency of the low-pass filter; and the quantizing means includes means for generating sub information for each band below the cut-off frequency of the low-pass filter.

5. The apparatus of claim 3 wherein the frequency dividing means includes an orthogonal transform circuit.

6. The apparatus of claim 3, wherein:

the apparatus additionally comprises:
 filter means for dividing the band-limited signal in frequency into a frequency range signal in each of plural frequency ranges, and
 block dividing means for dividing each frequency range signal in time into blocks; and the frequency dividing means includes means for orthogonally transforming the blocks of each frequency range signal to provide the spectral coefficients.

7. The apparatus of claim 6, wherein:

the filter means includes down sampling means for downsampling the frequency range signal in the frequency range wherein the cut-off frequency of the low-pass filter lies, the downsampling means generating a downsampled frequency range signal; and the block dividing means and the frequency dividing means operate on the downsampled frequency range signal.

8. The apparatus of claim 6, wherein the filter means divides the bandwidth-limited signal in frequency into frequency ranges including a lowest frequency range adjacent a next-lowest frequency range, the lowest frequency range and the next-lowest frequency range having an equal bandwidth.

9. The apparatus of claim 8, wherein the filter means divides the bandwidth-limited signal in frequency into frequency ranges additionally including a highest frequency range, the highest frequency range having a bandwidth greater than the lowest frequency range.

10. Apparatus for deriving a compressed digital signal from a digital input signal by compressing the digital input signal in a selected one of at least two compression modes, the digital input signal being compressed with a different compression ratio in each of the at least two compression modes, the compressed digital signal having a bit rate, the bit rate of the compressed digital signal being different in each of the compression modes, the apparatus comprising:

means for receiving the digital input signal at a fixed sampling frequency, the sampling frequency being invariable between the compression modes;

block dividing means for dividing the digital input signal in time into blocks, each block having a block length, the block lengths of the blocks having a maximum block length depending on the selected one of the compression modes, the maximum block length being greater in the compression modes wherein the digital output signal has a lower bit rate; and compressor means for deriving the compressed digital signal from the blocks of the digital input signal.

11. The apparatus of claim 10, wherein the compressor means includes:

frequency dividing means for deriving spectral coefficients from the digital input signal; and quantizing means for quantizing the spectral coefficients grouped by frequency into bands, the bands having a wider bandwidth towards higher frequencies.

12. The apparatus of claim 11, wherein the frequency dividing means includes an orthogonal transform circuit.

13. The apparatus of claim 11, wherein:

the apparatus additionally comprises filter means for dividing the digital input signal in frequency into a frequency range signal in each of plural frequency ranges;

the block dividing means is for dividing each frequency range signal in time into blocks, each block having a block length, the block lengths of the blocks having a maximum block length depending on the selected one of the compression modes; and the frequency dividing means includes means for orthogonally transforming the blocks of each frequency range signal to provide the spectral coefficients.

14. The apparatus of claim 13, wherein:

the filter means includes down sampling means for down-sampling one of the frequency range signals, the down-sampling means generating a downsampled frequency range signal; and the dividing means and the frequency dividing means operate on the downsampled frequency range signal.

15. The apparatus of claim 13, wherein the filter means divides the digital input signal in frequency into frequency ranges including a lowest frequency range adjacent a next-lowest frequency range, the lowest frequency range and the next-lowest frequency range having an equal bandwidth.

16. The apparatus of claim 15, wherein the filter means divides the bandwidth-limited signal in frequency into frequency ranges additionally including a highest frequency range, the highest frequency range having a bandwidth greater than the lowest frequency range.

17. The apparatus of claim 13, wherein the block length whereinto the block dividing means divides each frequency range signal has a minimum block length equal to a fraction of the maximum block length, the minimum block length whereinto the block dividing means divides the frequency range signal in at least the highest frequency range being the same irrespective of the compression mode.

18. Method for deriving a compressed digital signal from a digital input signal by compressing the digital input signal in a selected one of at least two compression modes, the digital signal being compressed with a different compression ratio in each of the at least two compression modes, the compressed digital signal having a bit rate, the bit rate of the compressed digital signal being different in each of the compression modes, the method comprising the steps of:

receiving the digital input signal at a fixed sampling frequency, the sampling frequency being invariable between the compression modes;

subjecting the digital input signal to low-pass filtering with a cut-off frequency set according to the selected one of the compression modes to provide a bandwidth-limited signal having a bandwidth defined by the cut-off frequency of the low-pass filtering; and deriving the compressed digital signal from the bandwidth-limited signal.

19. The method of claim 18, wherein:

the method additionally comprises the step of dividing the bandwidth-limited signal in time into blocks, each block having a block length, the block lengths of the blocks having a maximum block length depending on the selected one of the compression modes; and in the deriving step, the compressed digital signal is derived from the blocks of the bandwidth-limited signal.

20. The method of claim 18, wherein the step of deriving the compressed digital signal includes the steps of:

deriving spectral coefficients from the bandwidth-limited signal; and quantizing the spectral coefficients grouped by frequency into bands, the bands having a wider bandwidth towards higher frequencies.

21. The method of claim 20, wherein:

the method additionally comprises the step of providing quantizing bits;

the step of quantizing the spectral coefficients includes the step of allocating the quantizing bits among the bands for quantizing the spectral coefficients in each band, but allocating no quantizing bits to bands having a frequency above the cut-off frequency set according to the selected one of the compression modes; and the quantizing means includes means for generating sub information for each band having a frequency below the cut-off frequency set according to the selected one of the compression modes.

22. The method of claim 20, wherein the step of deriving spectral coefficients from the bandwidth-limited signal includes the step of orthogonally transforming the bandwidth-limited signal.

23. The method of claim 20, wherein:

the method additionally comprises the steps of:
dividing the band-limited signal in frequency into a frequency range signal in each of plural frequency ranges, and dividing each frequency range signal in time into blocks; and the step of deriving spectral coefficients from the bandwidth-limited signal includes the step of orthogonally transforming the blocks of each frequency range signal to provide the spectral coefficients.

24. The method of claim 23, wherein:

the step of dividing the band-limited signal in frequency includes the step of downsampling the frequency range signal in the frequency range wherein the cut-off frequency of the selected one of the compression modes lies to generate a downsampled frequency range signal; and the steps of dividing each frequency range signal in time into blocks, and of deriving spectral coefficients from the bandwidth-limited signal operate on the downsampled frequency range signal.

25. The method of claim 23, wherein, in the step of dividing the band-limited signal in frequency, the bandwidth-limited signal is divided in frequency into frequency ranges including a lowest frequency range adjacent a next-lowest frequency range, the lowest frequency range and the next-lowest frequency range having an equal bandwidth.

26. The method of claim 25, wherein, in the step of dividing the band-limited signal in frequency, the bandwidth-limited signal is divided in frequency into frequency ranges additionally including a highest frequency range, the highest frequency range having a bandwidth greater than the lowest frequency range.

27. The method of claim 18, additionally comprising the steps of:

providing a recording medium; and recording the compressed signal on the recording medium.

28. The method of claim 27, wherein, in the step of providing a recording medium, an optical disc is provided as the recording medium.

29. The method of claim 27, wherein, in the step of providing a recording medium, a semiconductor memory is provided as the recording medium.

30. Method for deriving a compressed digital signal from a digital input signal by compressing the digital input signal using a selected one of at least two compression modes, the digital input signal being compressed with a different compression ratio in each of the at least two compression modes, the compressed digital signal having a bit rate, the bit rate of the compressed digital signal being different in each of the compression modes, the method comprising steps of:

receiving the digital input signal at a fixed sampling frequency, the sampling frequency being invariable between the compression modes;

dividing the digital input signal in time into blocks, each block having a block length, the block lengths of the blocks having a maximum block length depending on the selected one of the compression modes, the maximum block length being greater in the compression modes wherein the digital output signal has a lower bit rate; and deriving the compressed digital signal from the blocks of the digital input signal.

31. The method of claim 30, wherein the step of deriving the compressed signal includes the steps of:

deriving spectral coefficients from the digital input signal; and quantizing the spectral coefficients grouped by frequency into bands, the bands having a wider bandwidth towards higher frequencies.

32. The method of claim 31, wherein the step of deriving spectral coefficients from the digital input signal includes the step of orthogonally transforming the digital input signal.

33. The method of claim 31, wherein:

the method additionally comprises the step of dividing the digital input signal in frequency into a frequency range signal in each of plural frequency ranges;

in the step of dividing the digital input signal in time, each frequency range signal is divided in time into blocks, each block having a block length, the block lengths of the blocks having a maximum block length depending on the selected one of the compression modes; and the step of deriving spectral coefficients from the digital input signal includes the step of orthogonally transforming the blocks of each frequency range signal to provide the spectral coefficients.

34. The method of claim 33, wherein:

the method additionally includes the step of downsampling one of the frequency range signals to generate a downsampled frequency range signal; and the steps of dividing the digital input signal in time and deriving spectral coefficients from the digital input signal operate on the downsampled frequency range signal.

35. The method of claim 33, wherein, in the step of dividing the digital input signal in frequency, the digital input signal is divided in frequency into frequency ranges including a lowest frequency range adjacent a next-lowest frequency range, the lowest frequency range and the next-lowest frequency range having an equal bandwidth.

36. The method of claim 35, wherein, in the step of dividing the digital input signal in frequency, the digital input signal is divided in frequency into frequency ranges additionally including a highest frequency range, the highest frequency range having a bandwidth greater than the lowest frequency range.

37. The method of claim 30, wherein, in the step of dividing each frequency range signal in time, each frequency range signal is divided into blocks additionally having a minimum block length equal to a fraction of the maximum block length, the minimum block length of the blocks in at least the highest frequency range being the same irrespective of the compression mode.

38. The method of claim 30, additionally comprising the steps of:

providing a recording medium; and recording the compressed signal on the recording medium.

39. The method of claim 38, wherein, in the step of providing a recording medium, an optical disc is provided as the recording medium.

40. The method of claim 38, wherein, in the step of providing a recording medium, a semiconductor memory is provided as the recording medium.

* * * * *